(12) United States Patent
Yasui et al.

(10) Patent No.: US 8,442,939 B2
(45) Date of Patent: May 14, 2013

(54) FILE SHARING METHOD, COMPUTER SYSTEM, AND JOB SCHEDULER

(75) Inventors: Takashi Yasui, Fuchu (JP); Masaaki Shimizu, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 962 days.

(21) Appl. No.: 12/388,174

(22) Filed: Feb. 18, 2009

(65) Prior Publication Data
US 2010/0169271 A1 Jul. 1, 2010

(30) Foreign Application Priority Data

Dec. 26, 2008 (JP) ................................. 2008-333135

(51) Int. Cl.
*G06F 7/00* (2006.01)
*G06F 17/00* (2006.01)

(52) U.S. Cl.
USPC ............................ 707/610; 707/640; 707/703

(58) Field of Classification Search .................. 707/610, 707/612, 620, 623, 640, 827, 703, 821
See application file for complete search history.

(56) References Cited

U.S. PATENT DOCUMENTS

| | | | | |
|---|---|---|---|---|
| 5,386,517 A | * | 1/1995 | Sheth et al. ...................... | 710/60 |
| 7,752,171 B2 | * | 7/2010 | De Spiegeleer ............... | 707/640 |
| 8,209,299 B2 | * | 6/2012 | Barsness et al. .............. | 707/688 |
| 2005/0117587 A1 | * | 6/2005 | Kawato .................... | 370/395.21 |
| 2008/0148272 A1 | * | 6/2008 | Yoshida ........................ | 718/104 |
| 2008/0222434 A1 | * | 9/2008 | Shimizu et al. ............... | 713/300 |
| 2009/0260012 A1 | * | 10/2009 | Borghetti et al. ............. | 718/102 |
| 2010/0132022 A1 | * | 5/2010 | Venkatasubramanian ........ | 726/7 |

FOREIGN PATENT DOCUMENTS

| | | |
|---|---|---|
| JP | 63-301352 A | 12/1988 |
| JP | 07-013823 A | 1/1995 |

OTHER PUBLICATIONS

Atsuya Uno, "Software of the Earth Simulator," Journal of the Earth Simulator, vol. 3, Sep. 2005, 52-59.*
Russel Sandberg, "The Sun Network Filesystem: Design, Implementation and Experience," Sun Microsystems, Inc. pp. 1-15.*
Atsuya Uno, "Software fo the Earth Simulator", Journal of the Earth Simulator, vol. 3, Sep. 2005, pp. 52-59.
Russel Sandberg, "The Sun Network Filesystem: Design, Implementation and Experience" in proceedings of the Summer 1986 USENIX Technical Conference and Exhibition, pp. 1-16.

* cited by examiner

*Primary Examiner* — Kimberly Wilson
*Assistant Examiner* — Hexing Liu
(74) *Attorney, Agent, or Firm* — Mattingly & Malur, PC

(57) ABSTRACT

Provided is a computer system including a plurality of computing hosts, which constructs a shared file system dynamically so that job execution efficiency is improved. In the computer system which includes the plurality of computing hosts and executes a job requested, in a case where the job is executed by the plurality of computing hosts, each computing host which executes the job is configured to: share a file necessary for executing the job; access the shared file to execute the requested job; and cancel the sharing of the file after execution of the requested job is completed.

13 Claims, 22 Drawing Sheets

JOB 200

```
#!/bin/sh
300  #SCHED  time="1:00"
310  #SCHED  nodes="2"
320  #SCHED  dir="/share"
330  #SCHED  in="/home/user/program"
340  #SCHED  out="/share/result"
     mpirun –np 2 /share/program
```

FIG. 2

COMPUTING HOST MANAGEMENT TABLE 216

| COMPUTING HOST IDENTIFIER (400) | COMPUTING HOST NAME (410) | IP ADDRESS (420) | EXECUTION JOB IDENTIFIER (430) |
|---|---|---|---|
| 0 | comp0 | 192.168.0.128 | 10 |
| 1 | comp1 | 192.168.0.129 | 10 |
| 2 | comp2 | 192.168.0.130 | 11 |
| ⋮ | ⋮ | ⋮ | ⋮ |

FIG. 3

FILE SYSTEM CONFIGURATION FILE 236

```
500  #FSCONF  master="comp0"
510  #FSCONF  sub="comp0, comp1"
520  #FSCONF  client="comp0, comp1"
530  #FSCONF  dir="/share"
```

FIG. 4

I/O HOST MANAGEMENT TABLE 1700

| I/O HOST IDENTIFIER (1800) | I/O HOST NAME (1810) | IP ADDRESS (1820) | ALLOCATED JOB IDENTIFIER (1830) |
|---|---|---|---|
| 0 | io0 | 192.168.0.128 | 10 |
| 1 | io1 | 192.168.0.129 | 10 |
| 2 | io2 | 192.168.0.130 | 11 |
| ⋮ | ⋮ | ⋮ | ⋮ |

FIG. 16

FILE SYSTEM CONFIGURATION FILE 236

| | |
|---|---|
| 1900 | #FSCONF master="io0" |
| 1910 | #FSCONF sub="io0, io1" |
| 520 | #FSCONF client="comp0, comp1" |
| 530 | #FSCONF dir="/share" |

FILE SHARING METHOD, COMPUTER SYSTEM, AND JOB SCHEDULER

CLAIM OF PRIORITY

The present application claims priority from Japanese patent application JP 2008-333135 filed on Dec. 26, 2008, the content of which is hereby incorporated by reference into this application.

BACKGROUND

This invention relates to a technology of executing, while accessing a file, a job in a computer system including a plurality of computing hosts.

There has been known a technology of building a computer system which includes hundreds to thousands of computing hosts coupled to a high-speed network. Each of the computing hosts is provided with a processor, and one or a plurality of computing hosts execute various kinds of processing. Such a computer system has been implemented as a cluster computer system, a massively parallel computer system, or a supercomputer. In those cases, such a large-scale computer system as described above processes a huge amount of data, which therefore requires high-speed file access.

In order to realize high-speed file access in a large-scale computer system, there is disclosed a technology called "file staging" in A. Uno, "Software of the Earth Simulator", Journal of the Earth Simulator, Volume 3, September 2005, 52-59. The file staging is a technology in which a file to be accessed for a job is transferred between a computing host and a login host before and after execution of the job. With the file staging, a job which is in execution in each computing host can be executed by just accessing a file stored in a local storage device provided for the computing host itself. Therefore, it is possible to realize high-speed file access.

Further, as a technology of sharing the same file among a plurality of computing hosts in a large-scale computer system, there is disclosed a technology called "shared file system" in R. Sandberg, "The Sun Network Filesystem: Design, Implementation and Experience", in Proceedings of the Summer 1986 USENIX Technical Conference and Exhibition. The shared file system is a technology in which a file to be accessed for a job is shared between a computing host and a login host. With the shared file system, there is no need to transfer the file to be accessed for the job between the computing host and the login host.

SUMMARY

In a computer system to which the file staging disclosed in the above-described "Software of the Earth Simulator" is applied, each computing host is provided with a local file system. Accordingly, a file to be accessed for a job needs to be transferred to each computing host.

Further, in a large-scale computer system, in order to improve execution efficiencies of the computing hosts, in a case where another job is allocated during the execution of a job, the another job is allocated to another computing host which is not involved in the execution of the job. In such a case, in a computer system in which the shared file system disclosed in R. Sandberg, "The Sun Network Filesystem: Design, Implementation and Experience", in Proceedings of the Summer 1986 USENIX Technical Conference and Exhibition is built, file accesses for the job which is in execution in each computing host concentrate on a host serving as a server to realize file sharing. As a result, there occurs a risk that file access for a certain job interferes with execution of another job.

In view of the above-mentioned problems, this invention has been made, and it is therefore an object of this invention to realize, for a computer system including a plurality of computing hosts, high-speed file sharing by sharing, at the time of execution of a job, a necessary file among computing hosts allocated to process the job.

The representative aspects of this invention are as follows. That is, there is provided a file sharing method used for a computer system which includes a plurality of computers, and which executes a job requested, the plurality of computers including a plurality of computing hosts which execute the job, each of the plurality of computing hosts comprising: a first interface coupled to another one of the plurality of computing hosts; a first processor coupled to the first interface; and a first memory coupled to the first processor, the file sharing method including the steps of, in a case where the job is executed by the plurality of computing hosts: sharing, by the first processor of the each of the plurality of computing hosts which execute the job, a file necessary for executing the job; executing, by the first processor of the each of the plurality of computing hosts which execute the job, the requested job through accessing the file; and canceling, by the first processor of the each of the plurality of computing hosts which execute the requested job, the sharing of the file after the executing of the requested job is completed.

According to the one aspect of this invention, by duplicating a necessary file prior to execution of a job, and sharing the file among the computing hosts, it is possible to access the file necessary for executing the job without being affected by another job.

BRIEF DESCRIPTION OF THE DRAWINGS

The present invention can be appreciated by the description which follows in conjunction with the following figures, wherein:

FIG. 2 is a diagram illustrating an example of a job according to the first embodiment of this invention;

FIG. 3 is a diagram illustrating an example of a computing host management table according to the first embodiment of this invention;

FIG. 4 is a diagram illustrating an example of a file system configuration file according to the first embodiment of this invention;

FIG. 16 is a diagram illustrating an example of an I/O host management table according to the second embodiment of this invention;

FIG. 17 is a diagram illustrating an example of a file system configuration file according to the second embodiment of this invention;

DETAILED DESCRIPTION OF THE PREFERRED EMBODIMENTS

Figure 1:
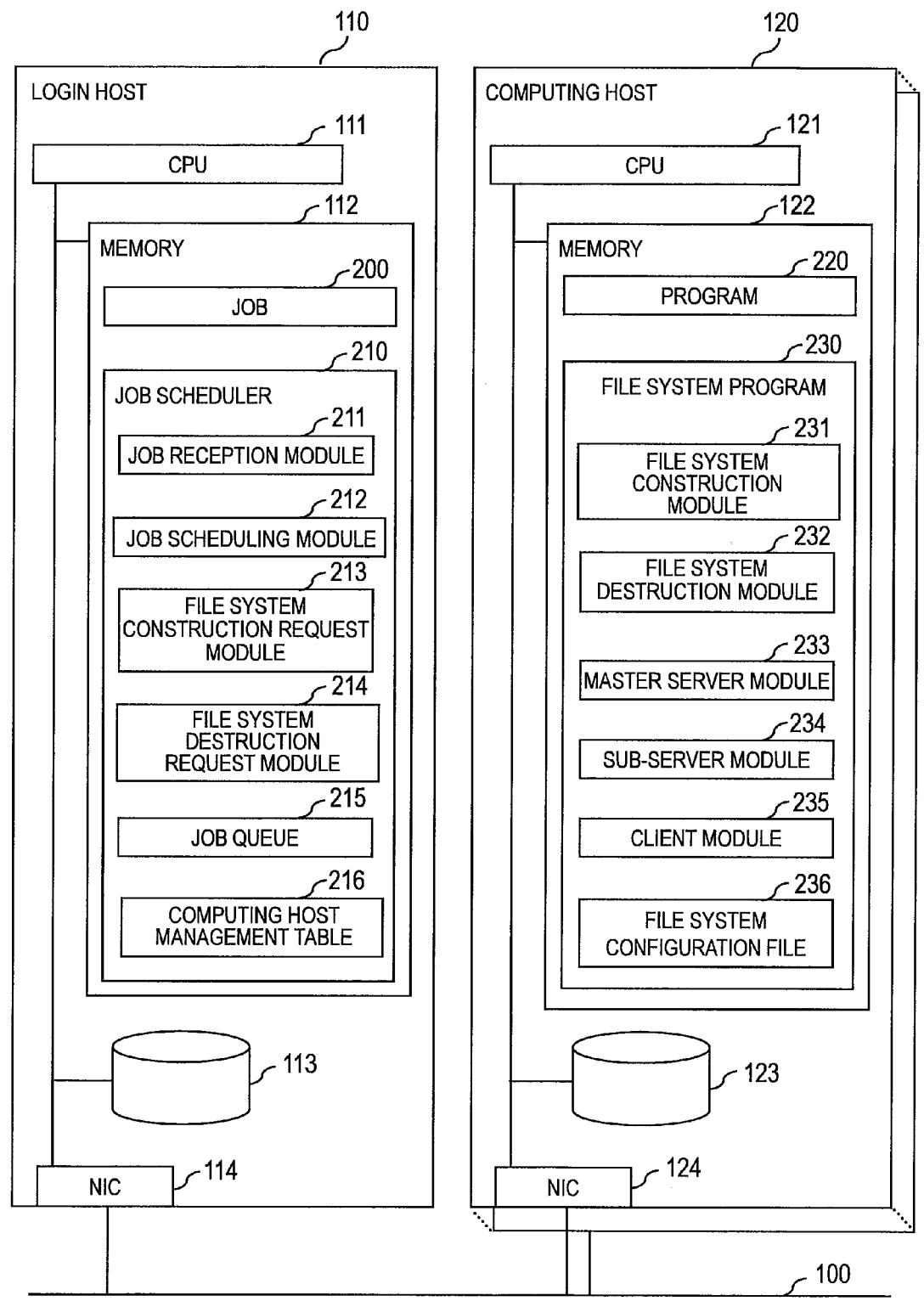
FIG. 1 is a diagram illustrating an example of a configuration of a computer system according to a first embodiment of this invention.

Hereinbelow, referring to the accompanying drawings, embodiments of this invention will be described. It should be noted that, in all the drawings attached for describing the embodiments of this invention, the same components are, in principle, denoted by the same reference numerals, and repetitive description thereof will be omitted.

First Embodiment

FIG. 1 is a diagram illustrating an example of a configuration of a computer system according to a first embodiment of this invention.

The computer system according to the first embodiment of this invention includes a login host 110 and a plurality of computing hosts 120. The login host 110 is coupled to the computing hosts 120 via a network 100. The computing hosts 120 are coupled to one another via the network 100 as well.

The login host 110 receives a request for an execution of a job from a user. The login host 110 also selects a computing host 120 which is to execute the requested job, and carries out such processing (job scheduling) as causing the selected computing host 120 to execute the job.

The login host 110 includes a CPU 111, a memory 112, a storage device 113, and a network interface card (NIC) 114.

By executing a program stored in the memory 112, the CPU 111 executes such processing as job scheduling.

The memory 112 stores a program to be executed by the CPU 111, and data necessary for executing the program. For example, the memory 112 stores a program for performing the job scheduling, and management information of the computing hosts 120. The program and data stored in the memory 112 will be described later.

The storage device 113 stores programs and files. For example, a program stored in the storage device 113 is loaded into the memory 112, and then executed by the CPU 111. The NIC 114 is an interface for establishing connection with the computing host 120 via the network 100.

The computing host 120 executes a job allocated by the login host 110. In some cases, a job is processed by a single computing host 120, and, in other cases, a job is processed by a plurality of computing hosts 120. The processing capabilities of the computing hosts 120 included in the computer system are essentially the same. In a case where the processing capabilities are different from each other at the time of executing a job with a plurality of computing hosts 120, there arises a fear that a computing host 120 inferior in processing capability becomes a bottleneck.

The computing host 120 includes a CPU 121, a memory 122, a storage device 123, and an NIC 124.

By executing a program stored in the memory 122, the CPU 121 processes an allocated job.

The memory 122 stores a program to be executed by the CPU 121, and data necessary for executing the program. For example, the memory 122 stores a program for executing a job. The program and data stored in the memory 122 will be described later.

The storage device 123 stores programs and files. For example, upon allocation of a job, a transferred program is stored. The stored program is loaded into the memory 122, and then executed by the CPU 121, whereby the allocated job is processed. The storage device 123 also stores a file necessary for executing a job, and constructs a shared file system.

The NIC 124 is an interface for establishing connection with the login host 110 and other computing hosts 120 via the network 100.

A hardware configuration of the computer system according to the first embodiment of this invention has been described above. Next, a software configuration thereof will be described.

The login host 110 according to the first embodiment of this invention stores a job 200 and a job scheduler 210 in the memory 112.

The job 200 includes information which is necessary for executing computational processing requested from a user. The job 200 includes, for example, data and a program for processing the data. The job 200 is executed by a single computing host 120 or by a plurality of computing hosts 120.

The job scheduler 210 is a program which is processed by the CPU 111. The job scheduler 210 performs management of the job 200, such as allocating the job 200 to the computing host 120, and canceling the allocation of the job 200.

The job scheduler 210 includes a job reception module 211, a job scheduling module 212, a file system construction request module 213, and a file system destruction request module 214.

The job reception module 211 receives a request for an execution of a job from a user. Detailed description of the processing performed by the job reception module 211 will be made later with reference to FIG. 5.

The job scheduling module 212 obtains a job stored in a job queue 215, and then allocates the job to the computing host 120 which is to execute the job. Further, upon the end of the execution of the job, the job scheduling module 212 cancels the allocation of the job to the computing host 120. Detailed description of the processing performed by the job scheduling module 212 will be made later with reference to FIGS. 6 and 7.

The file system construction request module 213 identifies computing hosts 120 which are to share a file, and then requests the computing host 120 to construct a shared file system. Detailed description of the processing performed by the file system construction request module 213 will be made later with reference to FIG. 8.

The file system destruction request module 214 makes a request for destruction of the constructed shared file system. Detailed description of the processing performed by the file system destruction request module 214 will be made later with reference to FIG. 9.

The job scheduler 210 further includes the job queue 215 and a computing host management table 216. The job queue 215 temporarily stores the job 200 which the user requests to be processed until the processing starts.

The computing host management table 216 keeps identification information of the computing hosts 120 and allocation states of the job 200 among the computing hosts 120. Detailed description of the configuration of the computing host management table 216 will be made later with reference to FIG. 3.

The computing host 120 according to the first embodiment of this invention stores a program 220 and a file system program 230 in the memory 122.

The program 220 is a program which is included in the job 200 allocated by the job scheduler 210 of the login host 110. With the CPU 121 executing the program 220, the job requested by the user is executed.

The file system program 230 is executed by the CPU 121, whereby construction and destruction of a shared file system and processing necessary for file access are performed.

The file system program 230 includes a file system construction module 231, a file system destruction module 232, a master server module 233, a sub-server module 234, and a client module 235.

The file system program 230 further includes a file system configuration file 236. The file system configuration file 236 keeps information of the computing hosts 120 which constitute the shared file system.

The file system construction module 231 constructs a file system based on the file system configuration file 236 which has been received from the login host 110. Detailed description of the processing performed by the file system construction module 231 will be made later with reference to FIG. 10.

Upon notification of completion of a job from the login host 110, the file system destruction module 232 destructs the constructed file system. Detailed description of the processing performed by the file system destruction module 232 will be made later with reference to FIG. 11.

The shared file system according to the first embodiment of this invention is configured by a master server, a sub-server, and a client. Upon allocation of the job 200 by the login host 110, the computing host 120 executes at least one function from among the functions of the master server, the sub-server, and the client.

The client receives a file access request made by the job 200. The sub-server stores a file to be shared in the storage device 123. The master server manages a storage location of the file, and, in a case where an inquiry is made about the storage location of the file by the client, notifies which sub-server stores the file.

According to the first embodiment of this invention, in a case where a job is processed by a plurality of computing hosts 120, the program 220 included in the job 200 is executed by each of the computing hosts 120. Therefore, the function of the client is executed by each computing host 120.

The master server module 233 executes processing which, in the constructed shared file system, causes the computing host 120 to behave as a master server. Detailed description of the processing performed by the master server module 233 will be made later with reference to FIG. 12.

The sub-server module 234 executes processing which, in the constructed shared file system, causes the computing host 120 to behave as a sub-server. Detailed description of the processing performed by the sub-server module 234 will be made later with reference to FIG. 13.

The client module 235 executes processing which, in the constructed shared file system, causes the computing host 120 to behave as a client. Detailed description of the processing performed by the client module 235 will be made later with reference to FIG. 14.

FIG. 2 is a diagram illustrating an example of the job 200 according to the first embodiment of this invention.

The job 200 according to the first embodiment of this invention includes, as described above, information necessary for executing the requested computational processing. FIG. 2 illustrates a script file, which is one form of execution request for the job 200.

To describe more specifically, in the job 200, there are defined an estimated execution time 300, a number of computing hosts to be used 310, a shared directory name 320, a stage-in file list 330, and a stage-out file list 340.

The estimated execution time 300 represents an estimated value of a period of time required to process the job 200. The number of computing hosts to be used 310 represents the number of computing hosts 120 which are to process the job 200. The shared directory name 320 represents the name of a shared directory which stores a file shared among the computing hosts which process the job.

The stage-in file list 330 represents a list of files which are copy sources of the files stored in the shared directory. Upon construction of the shared file system, a directory which is identified by the shared directory name 320 is mounted, and then, a file specified by the stage-in file list 330 is duplicated.

The stage-out file list 340 represents a list of files to which a processing result of the job 200 is output. Upon completion of the execution of the job, a file specified by the stage-out file list 340 is transferred to the login host 110.

FIG. 3 is a diagram illustrating an example of the computing host management table 216 according to the first embodiment of this invention.

The computing host management table 216 includes a computing host identifier 400, a computing host name 410, an IP address 420, and an execution job identifier 430.

The computing host identifier 400 represents an identifier for identifying the computing host 120 included in the computer system. The computing host name 410 represents a name of the computing host 120. The IP address 420 represents an IP address of the computing host 120.

The execution job identifier 430 represents an identifier of the job 200 executed by the computing host 120. Referring to FIG. 3, the job 200 having the execution job identifier 430 of "10" is executed by the computing hosts "comp0" and "comp1".

FIG. 4 is a diagram illustrating an example of the file system configuration file 236 according to the first embodiment of this invention.

The login host 110 creates, based on the received execution request for the job 200, the file system configuration file 236 which includes definition information of the shared file system. The login host 110 transmits the created file system configuration file 236 to the computing host 120, and gives an instruction to construct a shared file system.

To describe more specifically, the file system configuration file 236 includes a master server computing host name 500, a sub-server computing host name list 510, a client computing host name list 520, and a shared directory name 530.

The master server computing host name 500 represents a name of the computing host 120 which serves as the master server in the shared file system.

The sub-server computing host name list 510 represents a list of computing hosts 120 which serve as the sub-servers. In the sub-server computing host name list 510, at least one name of a computing host 120 is described.

The client computing host name list 520 represents a list of computing hosts 120 which serve as the clients. In the client computing host name list 520, at least one name of a computing host 120 is described.

In the shared directory name 530, the name of a directory which stores the shared file is described. For example, the shared directory name 320 included in the execution request for the job 200 illustrated in FIG. 2 is set.

Figure 5:
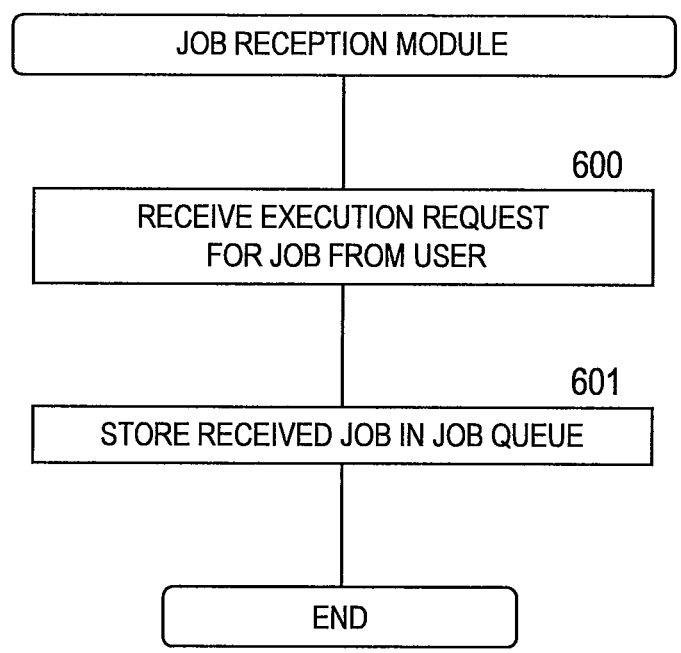
FIG. 5 is a flow chart illustrating a procedure in which an execution request for a job is received from a user by a job reception module according to the first embodiment of this invention.

FIG. 5 is a flow chart illustrating a procedure in which an execution request for the job 200 is received from the user by the job reception module 211 according to the first embodiment of this invention.

The CPU 111 of the login host 110 receives the execution request for the job 200 from the user by executing the job reception module 211 (Step 600).

The CPU 111 of the login host 110 temporarily stores the job 200 received in the processing of Step 600 in the job queue 215 (Step 601).

Figure 6:
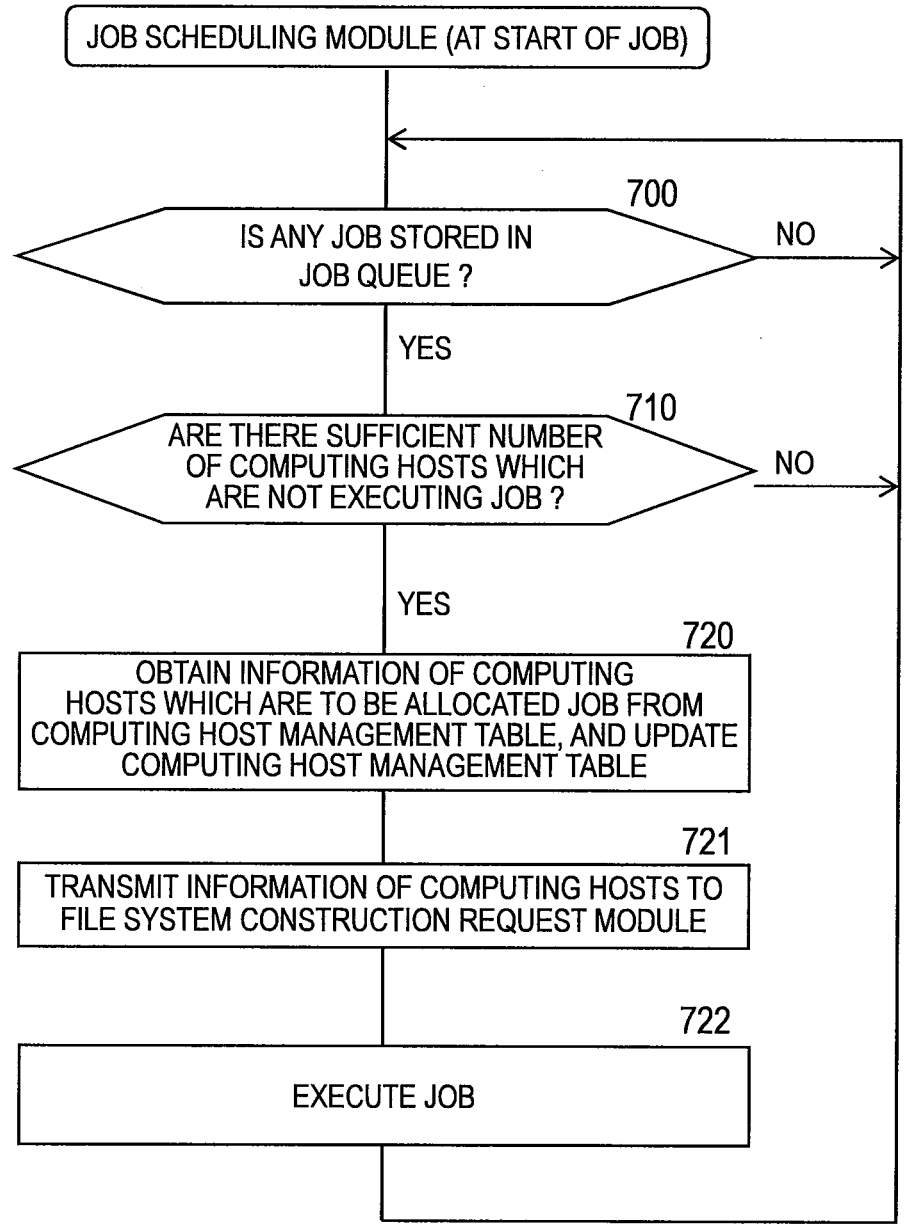
FIG. 6 is a flow chart illustrating a procedure in which a job waiting for execution is allocated to the computing host by a job scheduling module according to the first embodiment of this invention.

FIG. 6 is a flow chart illustrating a procedure in which a job 200 waiting for execution is allocated to the computing host 120 by the job scheduling module 212 according to the first embodiment of this invention.

First, the CPU 111 of the login host 110 judges whether or not any job 200 waiting for execution is stored in the job queue 215 (Step 700). In a case where no job 200 waiting for execution is stored in the job queue 215 (the result of Step 700 is "No"), there is no job 200 to be processed, and hence the CPU 111 of the login host 110 waits until a job 200 waiting for execution is stored in the job queue 215.

In a case where a job 200 waiting for execution is stored in the job queue 215 (the result of Step 700 is "Yes"), the CPU 111 of the login host 110 judges whether or not it is possible to assure a sufficient number of computing hosts 120 to execute the job 200 (Step 710).

Specifically, the processing of Step 710 is processing in which it is judged whether or not the number of computing hosts 120 which are not executing a job is equal to or larger than the number of computing hosts 120 specified by the execution request for the job 200. The number of computing hosts 120 which are not executing a job can be obtained by referring to the computing host management table 216, and counting the number of computing hosts 120 for which no value is registered as the execution job identifier 430. The number of computing hosts 120 specified by the execution request for the job 200 corresponds to a value which is set as the number of computing hosts to be used 310 illustrated in FIG. 2.

In a case where it is possible to assure a sufficient number of computing hosts 120 to execute the job 200 (the result of Step 710 is "Yes"), the CPU 111 of the login host 110 obtains, from the computing host management table 216, information of the computing hosts 120 which are to be allocated the job 200, and then updates the computing host management table 216 (Step 720). Specifically, the CPU 111 of the login host 110 obtains a record associated with the computing host 120 which is to be allocated the job 200, and then registers, as the execution job identifier 430 of the record, the identifier of the job 200 to be executed.

Based on the information of the computing hosts 120 which are to be allocated the job 200, the CPU 111 of the login host 110 constructs a shared file system by executing the file system construction request module 213 (Step 721).

Upon constructing the shared file system, the CPU 111 of the login host 110 obtains the job 200 waiting for execution from the job queue 215, and requests the computing host 120 to execute the obtained job 200 (Step 722).

Figure 7:
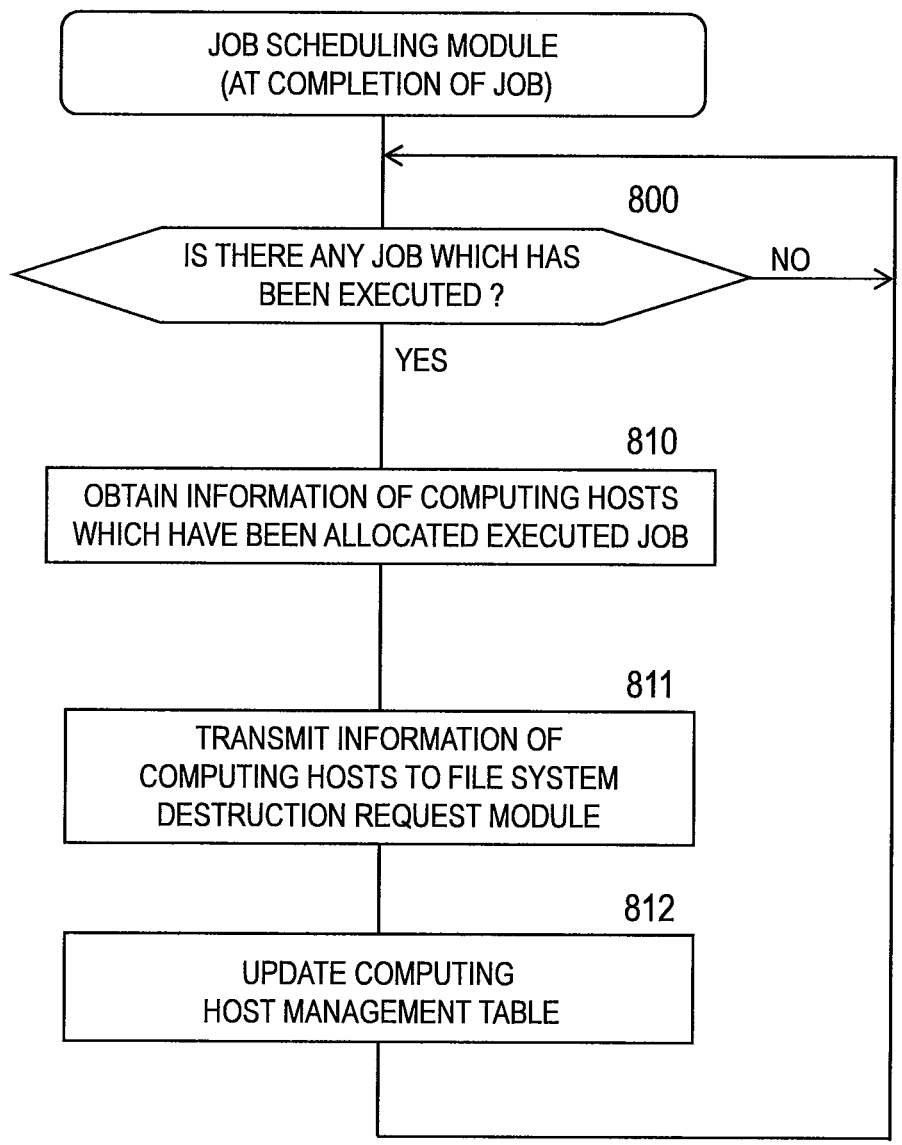
FIG. 7 is a flow chart illustrating a procedure in which allocation of the job to the computing hosts is canceled by the job scheduling module according to the first embodiment of this invention.

FIG. 7 is a flow chart illustrating a procedure in which allocation of the job 200 to the computing hosts 120 is canceled by the job scheduling module 212 according to the first embodiment of this invention.

The CPU 111 of the login host 110 judges whether or not there is any job 200 which has been executed (Step 800). Completion of the job 200 may be judged by, for example, receiving a notification of execution completion of the job 200 from the computing host 120, or making an inquiry to the computing host 120 periodically.

In a case where there is no job 200 which has been executed (the result of Step 800 is "No"), the CPU 111 of the login host 110 waits until the job 200 has been executed.

On the other hand, in a case where there is a job 200 which has been executed (the result of Step 800 is "Yes"), the CPU 111 of the login host 110 obtains, from the computing host management table 216, information of the computing hosts 120 which have been allocated the executed job 200 (Step 810).

Further, based on the information of the computing hosts 120 obtained in the processing of Step 810, the CPU 111 of the login host 110 executes the file system destruction request module 214 to thereby destruct the shared file system (Step 811).

Lastly, the CPU 111 of the login host 110 updates the computing host management table 216 (Step 812). Specifically, the CPU 111 of the login host 110 clears, in the computing host management table 216, the execution job identifier 430 of a record associated with the computing host 120 which has been allocated the executed job 200.

Figure 8:
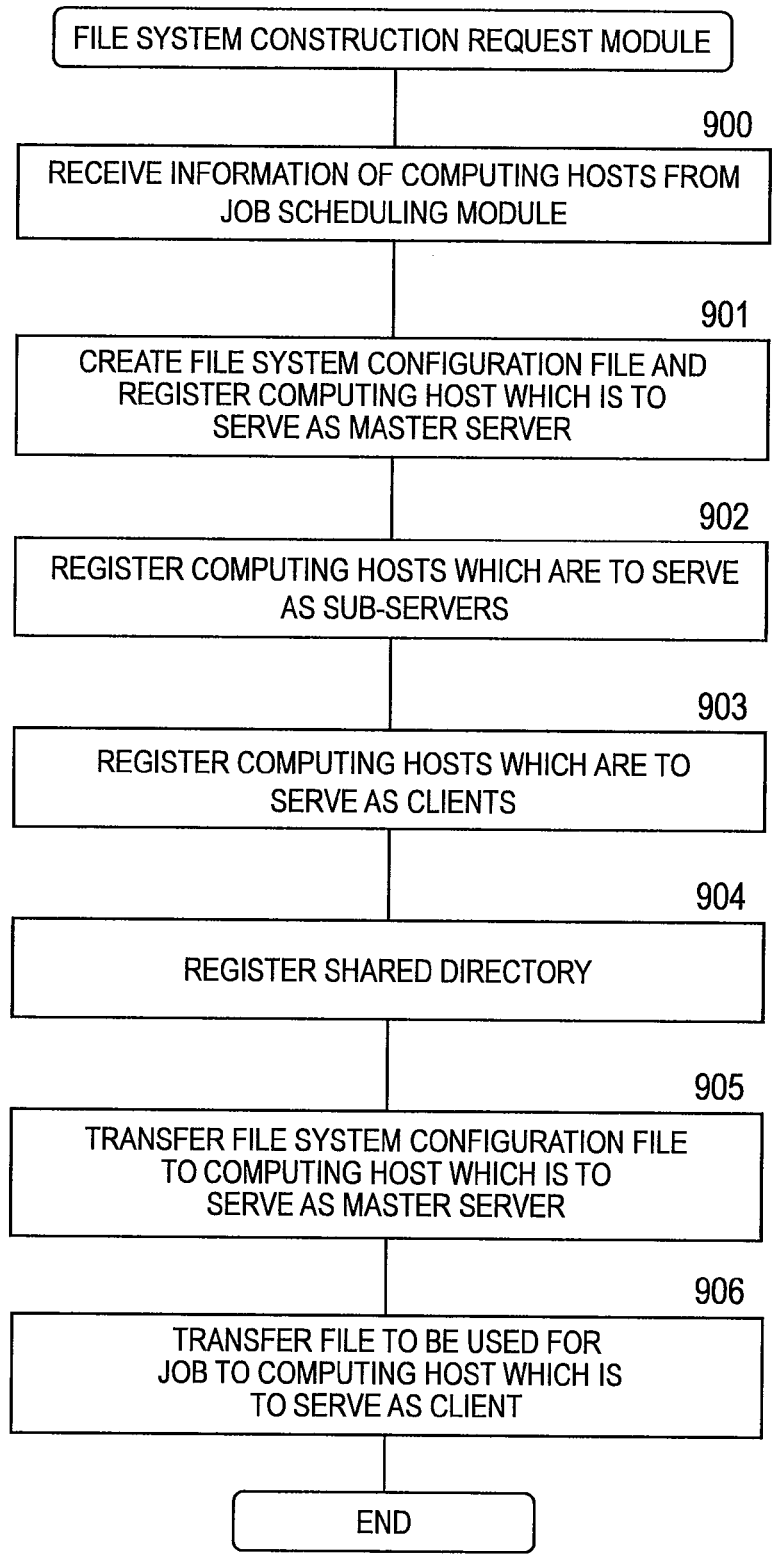
FIG. 8 is a flow chart illustrating a procedure in which a request to construct a shared file system is made by a file system construction request module according to the first embodiment of this invention.

FIG. 8 is a flow chart illustrating a procedure in which a request to construct a shared file system is made by the file system construction request module 213 according to the first embodiment of this invention.

First, the CPU 111 of the login host 110 receives information of the computing hosts 120 which are to be allocated the job 200 from the job scheduling module 212 (Step 900).

Based on the received information of the computing host 120, the CPU 111 of the login host 110 creates the file system configuration file 236 (Step 901). The content of the file system configuration file 236 is as described with reference to FIG. 4 as an example. Hereinbelow, referring to the file system configuration file 236 illustrated in FIG. 4, the processing will be described in detail.

First, upon creation of the file system configuration file 236, the CPU 111 of the login host 110 registers a computing host 120 which is to serve as the master server (Step 901). Specifically, the CPU 111 of the login host 110 selects one computing host 120 from among the computing hosts 120 which are allocated the job 200, and then registers the name of the selected computing host 120 as the master server computing host name 500 of the file system configuration file 236. In selecting a computing host 120 which is to serve as the master server, for example, a computing host 120 having the smallest identifier may be selected from among the computing hosts 120 which are allocated the job 200.

Next, the CPU 111 of the login host 110 registers computing hosts 120 which are to serve as the sub-servers (Step 902). According to the first embodiment of this invention, in order for all the computing hosts 120 which are allocated the job 200 to function as the sub-servers, the CPU 111 of the login host 110 registers, in the sub-server computing host name list 510 of the file system configuration file 236, all the computing hosts 120 which are allocated the job 200.

Further, the CPU 111 of the login host 110 registers computing hosts 120 which are to serve as the clients (Step 903). Specifically, the CPU 111 of the login host 110 registers all the computing hosts 120 which are allocated the job 200 in the client computing host name list 520 of the file system configuration file 236. According to the first embodiment of this invention, all the computing hosts 120 which are allocated the job 200 execute the job, and hence, in order to minimize an overhead at the time of executing such processing that requires file access, all the computing hosts 120 execute the client function.

The CPU 111 of the login host 110 registers a directory in which a shared file is to be stored (Step 904). Specifically, the CPU 111 of the login host 110 registers the directory for the shared file (shared directory name 320 of FIG. 2), which is defined in the job 200, in the shared directory name 530.

The CPU 111 of the login host 110 transfers the created file system configuration file 236 to the computing host 120 which is registered as the master server of the shared file system in the processing of Step 901 (Step 905). At this time, an instruction to execute the file system construction module 231 may be given to the computing host 120 which is a transfer destination of the file system configuration file 236. When the processing of Step 905 is ended, constructing the shared file system has been completed among the computing hosts 120 which process the job 200.

The CPU 111 of the login host 110 transfers a file to be used for the job 200 to one of the computing hosts 120 which are registered as the clients of the shared file system in the processing of Step 903 (Step 906). Specifically, the file to be transferred is a file specified in the stage-in file list 330 of FIG. 2. As the computing host 120 to which the file is to be transferred, for example, a computing host 120 having the smallest identifier may be selected from among the computing hosts 120 which serve as the clients.

Figure 9:
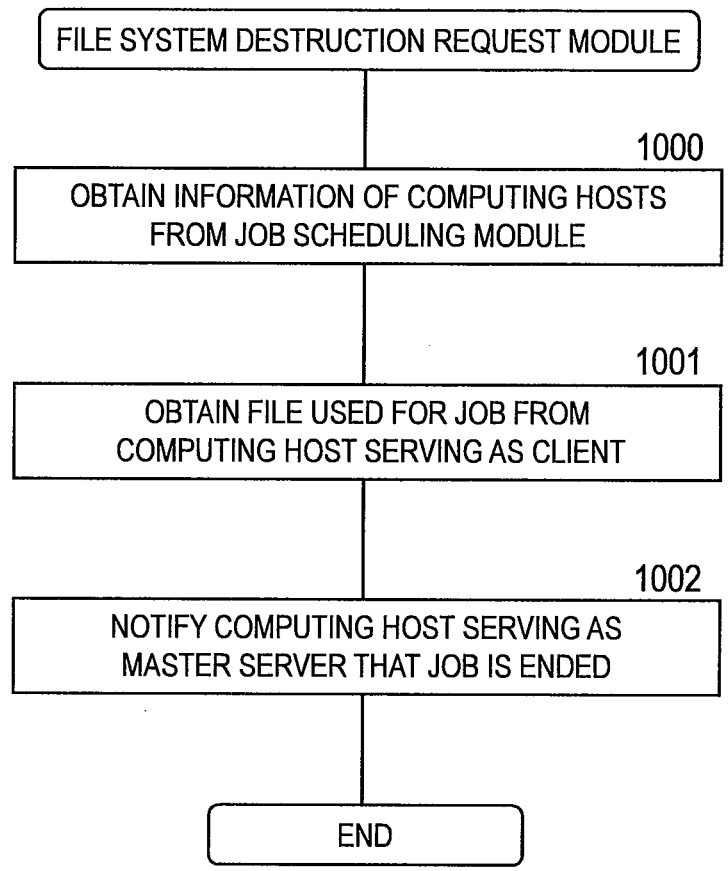
FIG. 9 is a flow chart illustrating a procedure in which a request to destruct a shared file system is made by a file system destruction request module according to the first embodiment of this invention.

FIG. 9 is a flow chart illustrating a procedure in which a request to destruct the shared file system is made by the file system destruction request module 214 according to the first embodiment of this invention.

First, the CPU 111 of the login host 110 receives, from the job scheduling module 212, information of the computing hosts 120 which are allocated the job 200 (Step 1000).

Based on the received information of the computing hosts 120, the CPU 111 of the login host 110 obtains the file which has been used for the job 200 from the computing host 120 serving as the client of the shared file system (Step 1001). The file which has been used for the job 200 corresponds to a file specified in the stage-out file list 340 of FIG. 2. As the client computing host 120 used for obtaining the file, for example, a computing host 120 having the smallest identifier may be selected.

Lastly, the CPU 111 of the login host 110 notifies the computing host 120 registered as the master server of the shared file system that the execution of the job 200 has been ended (Step 1002).

Figure 10:
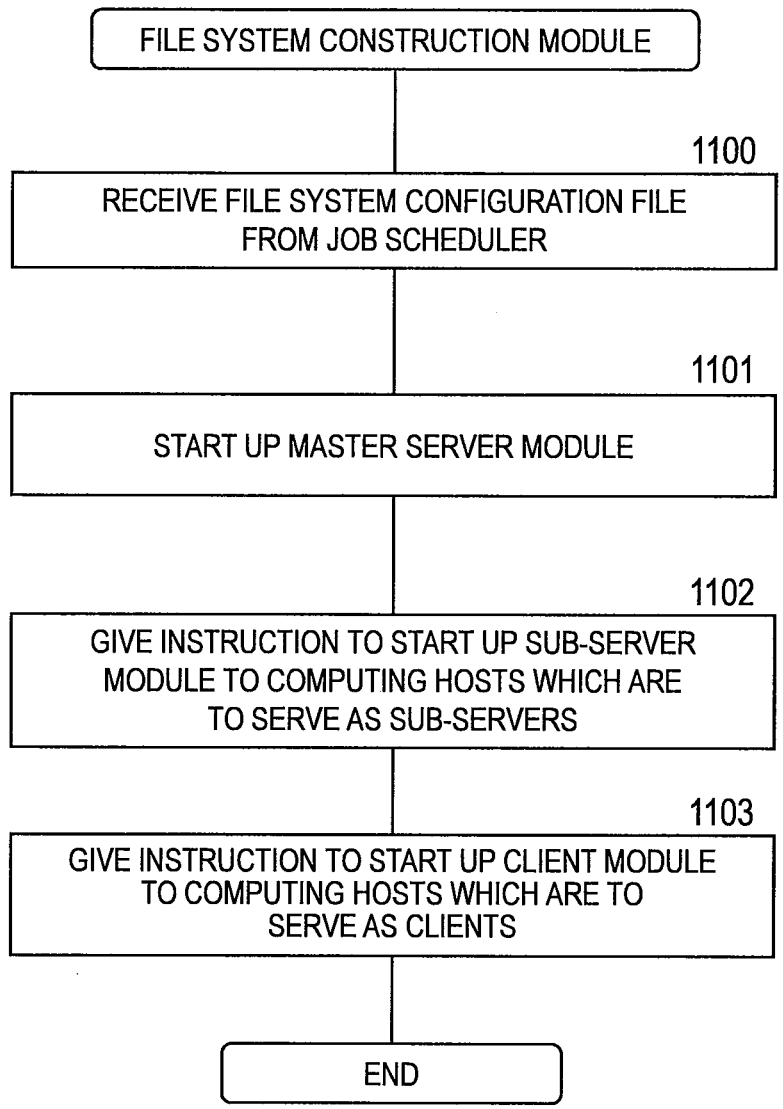
FIG. 10 is a flow chart illustrating a procedure in which a shared file system is constructed by a file system construction module according to the first embodiment of this invention.

FIG. 10 is a flow chart illustrating a procedure in which a shared file system is constructed by the file system construction module 231 according to the first embodiment of this invention.

The CPU 121 of the computing host 120 receives the file system configuration file 236 transmitted by the job scheduler 210 of the login host 110 (Step 1100).

The CPU 121 of the computing host 120 starts up the master server module 233 so as to operate as the master server of the shared file system (Step 1101). It should be noted that detailed description of the processing performed by the master server module 233 will be made later with reference to FIG. 12.

Next, the CPU 121 of the computing host 120 gives an instruction to start up the sub-server module 234 to the computing hosts 120 which are registered in the sub-server computing host name list 510 of the file system configuration file 236 received in the processing of Step 1100 (Step 1102). It should be noted that detailed description of the processing performed by the sub-server module 234 will be made later with reference to FIG. 13.

Lastly, the CPU 121 of the computing host 120 gives an instruction to start up the client module 235 to the computing hosts 120 which are registered in the client computing host name list 520 of the file system configuration file 236 received in the processing of Step 1100 (Step 1103). It should be noted that detailed description of the processing performed by the client module 235 will be made later with reference to FIG. 14.

After the completion of constructing the shared file system with the processing illustrated in FIG. 10, the job 200 is executed in each of the computing hosts 120 which are allocated the job 200 (Step 722 of FIG. 6).

Figure 11:
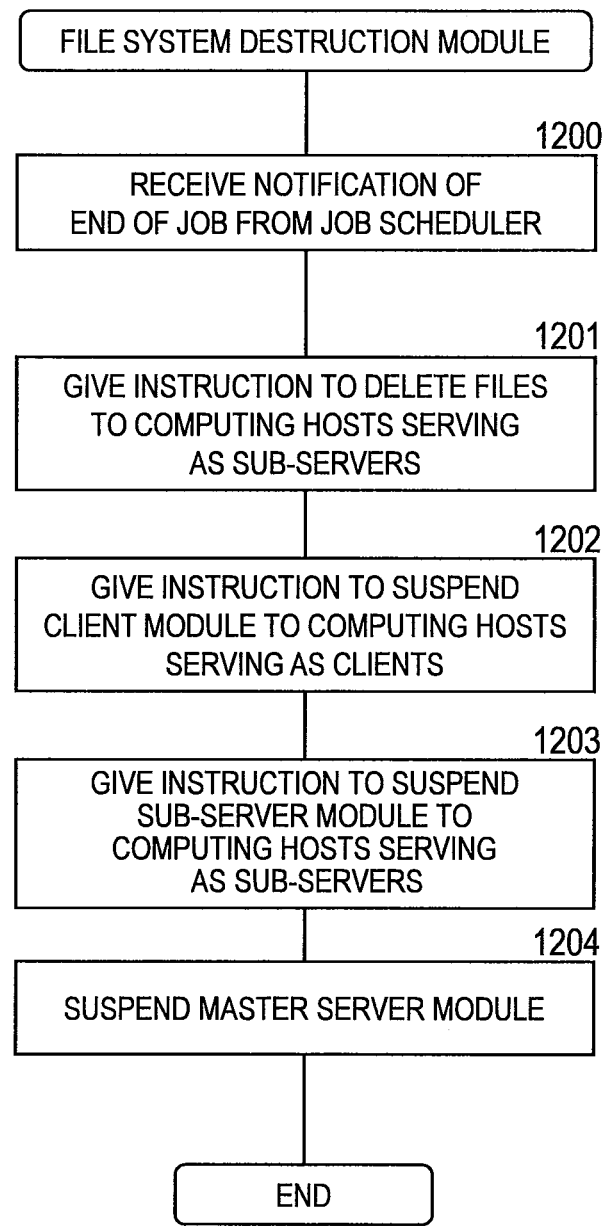
FIG. 11 is a flow chart illustrating a procedure in which a shared file system is destructed by a file system destruction module according to the first embodiment of this invention.

FIG. 11 is a flow chart illustrating a procedure in which a shared file system is destructed by the file system destruction module 232 according to the first embodiment of this invention.

The CPU 121 of the computing host 120 receives a notification of the end of the job from the job scheduler 210 of the login host 110 (Step 1200).

The CPU 121 of the computing host 120 refers to the file system configuration file 236, and then instructs all the computing hosts 120 registered as the sub-servers to delete a file which is duplicated at the time of execution of the job 200, and a file which is generated during the execution of the job 200 (Step 1201).

The CPU 121 of the computing host 120 refers to the file system configuration file 236, and then instructs all the computing hosts 120 registered as the clients of the shared file system to suspend the client module 235 (Step 1202).

The CPU 121 of the computing host 120 refers to the file system configuration file 236, and then instructs all the computing hosts 120 registered as the sub-servers of the shared file system to suspend the sub-server module 234 (Step 1203).

Lastly, the CPU 121 of the computing host 120 suspends the master server module 233 (Step 1204).

Figure 12:
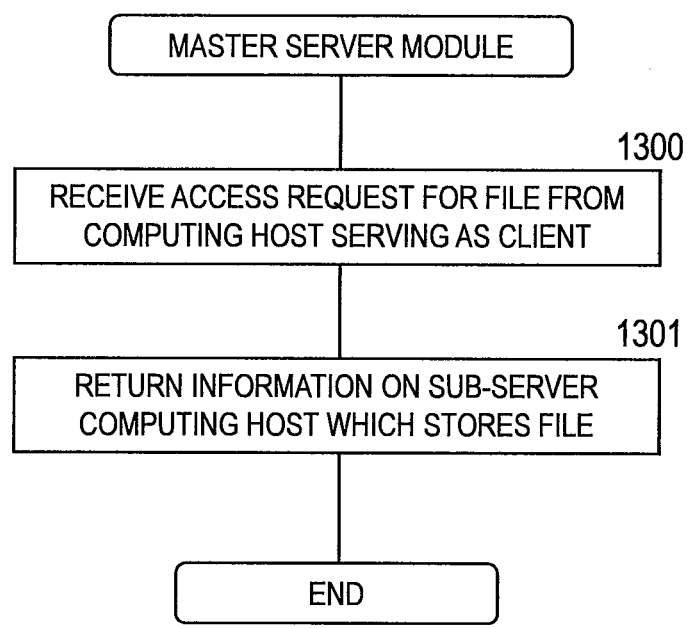
FIG. 12 is a flow chart illustrating a procedure of a processing performed by a master server of the shared file system according to the first embodiment of this invention.

FIG. 12 is a flow chart illustrating a procedure of the processing performed by the master server of the shared file system according to the first embodiment of this invention.

This processing is executed continuously by the master server module 233 until the shared file system is destructed. The function carried out as the master server does not include processing of directly accessing a file stored in the storage device 123, which therefore makes a load thereof smaller compared to execution of a job or file access processing. Thus, according to the first embodiment of this invention, as illustrated in the file system configuration file 236 of FIG. 4, the master server is allocated to any one of the sub-servers in an overlapping manner.

The CPU 121 of the computing host 120 receives an access request for a file, which is transmitted by the computing host 120 serving as the client of the shared file system (Step 1300).

The CPU 121 of the computing host 120 notifies the computing host 120, which has transmitted the access request in the processing of Step 1300, of information of the sub-server computing host 120 which stores the requested file (Step 1301). In order to identify the sub-server which stores the files, for example, a correlation between the file stored in the shared directory and the computing host 120 which actually stores the file may be kept. Alternatively, by using another commonly-used file management method, the computing host 120 serving as the sub-server may be identified.

Figure 13:
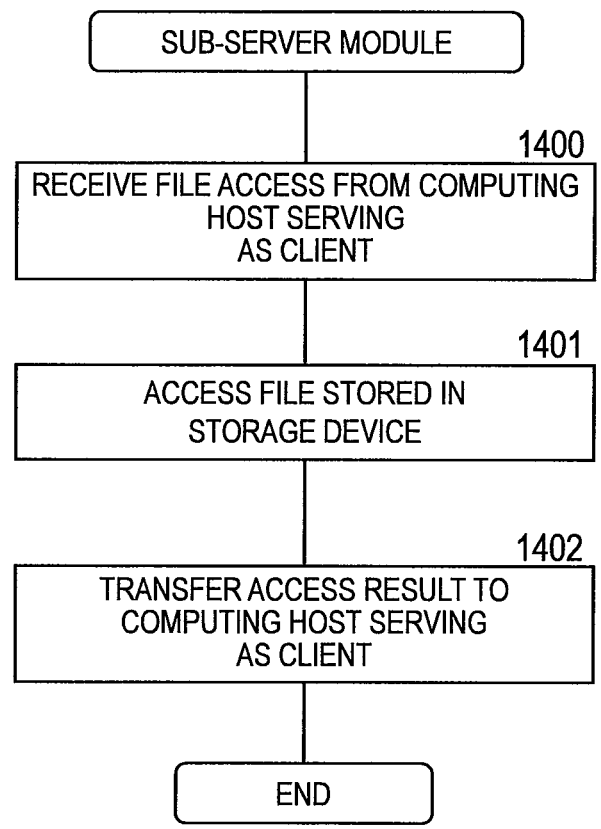
FIG. 13 is a flow chart illustrating a procedure of a processing performed by a sub-server of the shared file system according to the first embodiment of this invention.

FIG. 13 is a flow chart illustrating a procedure of the processing performed by the sub-server of the shared file system according to the first embodiment of this invention.

This processing is executed continuously by the sub-server module 234 until the shared file system is destructed.

The CPU 121 of the computing host 120 receives an access request for a file, which is transmitted by the client module 235 of the computing host 120 serving as the client of the shared file system (Step 1400).

Based on the access request received in the processing of Step 1400, the CPU 121 of the computing host 120 accesses the file stored in the storage device 123 (Step 1401). Further, the CPU 121 of the computing host 120 transfers an access result of the file to the computing host 120 which is a client of a request source (Step 1402).

Figure 14:
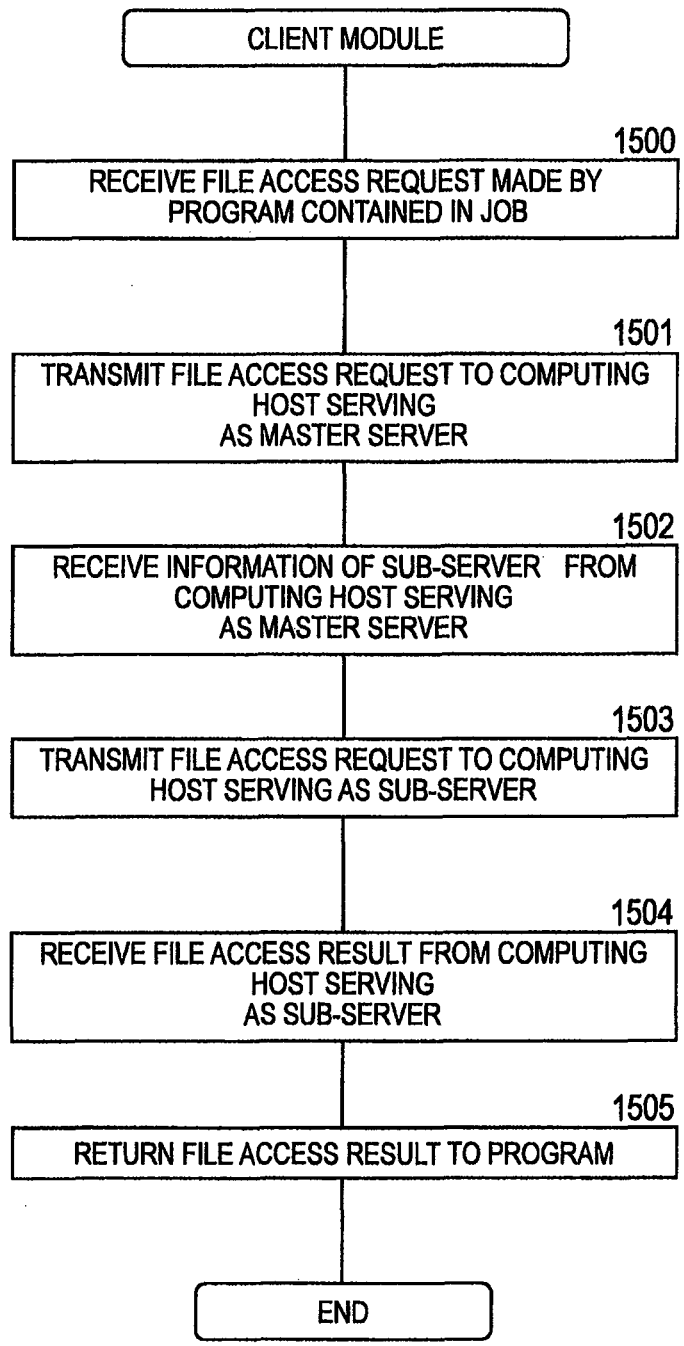
FIG. 14 is a flow chart illustrating a procedure of a processing performed by a client of the shared file system according to the first embodiment of this invention.

FIG. 14 is a flow chart illustrating a procedure of the processing performed by the client of the shared file system according to the first embodiment of this invention.

This processing is executed continuously by the client module 235 until the shared file system is destructed.

The CPU 121 of the computing host 120 receives a file access requested through execution of the program 220 included in the job 200 (Step 1500).

First, the CPU 121 of the computing host 120 issues a file access request to the computing host 120 serving as the master server of the shared file system (Step 1501).

The CPU 121 of the computing host 120 receives, from the computing host 120 serving as the master server, the information of the sub-server computing host 120 having the storage device 123 which actually stores the file (Step 1502).

Based on the information of the computing host 120 serving as the sub-server, which has been received in the processing of Step 1502, the CPU 121 of the computing host 120 issues an access request for the files (Step 1503).

The CPU 121 of the computing host 120 receives, from the computing host 120 serving as the sub-server, an access result of the file access request transmitted in the processing of Step 1503 (Step 1504).

Lastly, the CPU 121 of the computing host 120 returns the access result of the file, which has been received in the processing of Step 1504, to the program 220 (Step 1505).

As is described above, according to the first embodiment of this invention, a shared file system can be constructed dynamically at the time of execution of the job 200. Specifically, upon reception of the job 200 (FIG. 5), the computing hosts 120 which are to process the job 200 are allocated for the job 200 (FIG. 6). Then, a shared file system configured by the computing hosts 120 which are to process the job 200 is constructed (FIGS. 8 and 10). After that, the job 200 is processed while accessing the shared file system thus constructed (FIGS. 12 to 14). Lastly, when the job is ended, the constructed shared file system is destructed (FIGS. 9 and 11).

According to the first embodiment of this invention, it is possible to dynamically construct a shared file system which is configured by the computing hosts 120 which are allocated the job 200. Therefore, a processing delay caused by file access from another job or the like can be prevented. In addition, the shared file system is constructed by duplicating only a file necessary for the execution of the job 200, and hence the shared file system can be constructed quickly.

Second Embodiment

The computer system according to the first embodiment of this invention is configured by the login host 110 and the computing host 120, but a computer system according to a second embodiment of this invention further includes an I/O host, which is a computer having a higher file access capability than the computing host 120. According to the second embodiment of this invention, by the I/O host accessing a file, a period of time required to process a job is shortened.

Hereinbelow, with reference to the drawings, the second embodiment of this invention will be described. It should be noted that the contents common to the first embodiment of this invention will be omitted as appropriate, and differences from the first embodiment of this invention will be mainly described.

Figure 15:
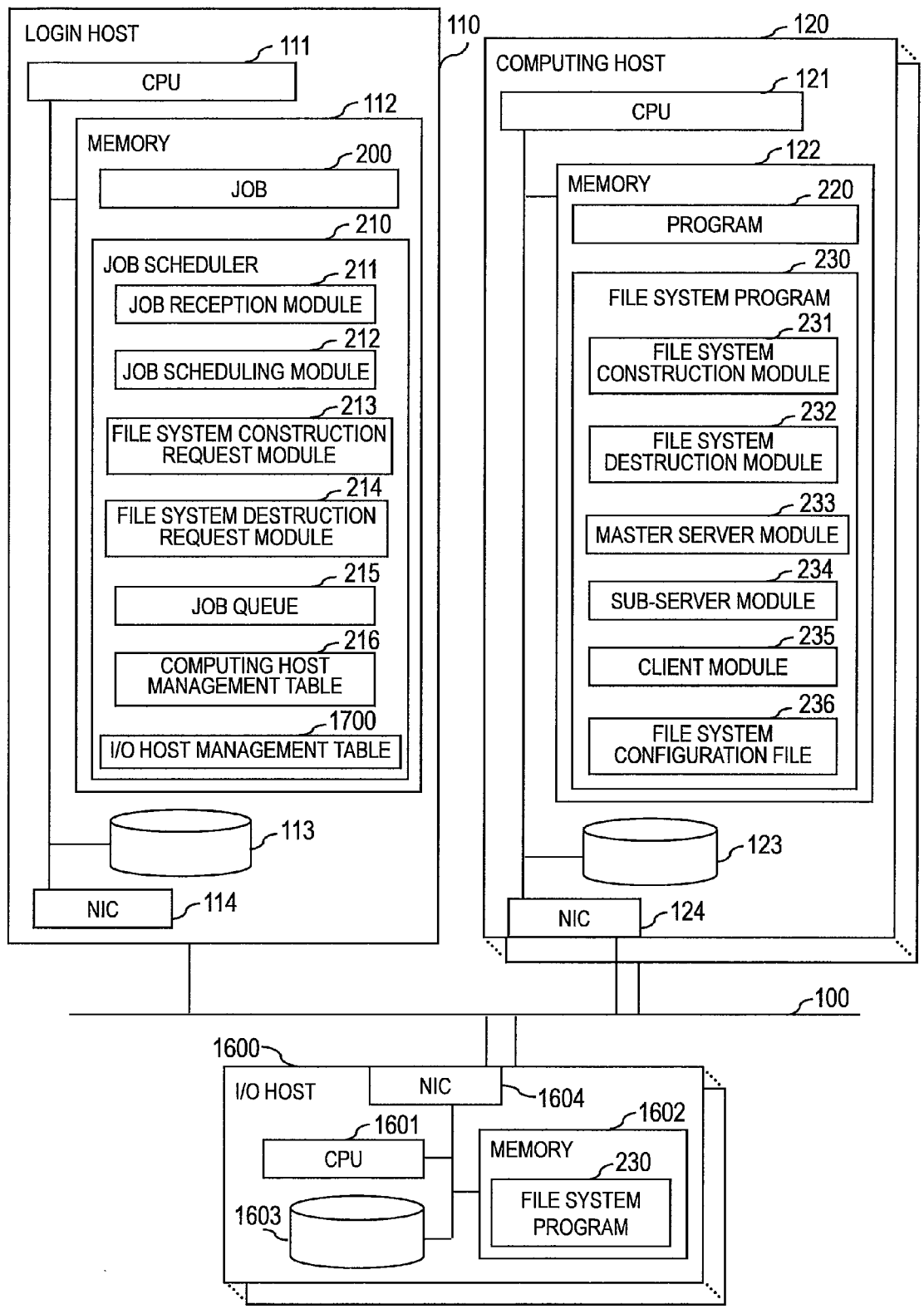
FIG. 15 is a diagram illustrating an example of a configuration of a computer system according to a second embodiment of this invention.

FIG. 15 is a diagram illustrating an example of a configuration of the computer system according to the second embodiment of this invention.

As is described above, the computer system according to the second embodiment of this invention further includes a plurality of I/O hosts 1600 in addition to the login host 110 and a plurality of the computing hosts 120. The login host 110, the computing hosts 120, and the I/O hosts 1600 are coupled via the network 100. Further, the plurality of I/O hosts 1600 are coupled to one another via the network 100 as well.

The hardware configurations of the login host 110 and the computing host 120 are the same as those of the first embodiment of this invention.

Similarly to the computing hosts 120, the I/O hosts 1600 are dynamically allocated for a job at the time of execution of the job. Here, the number of the I/O hosts 1600 to be allocated for the job does not necessarily have to be equal to the number of the computing hosts 120.

The I/O host 1600 includes a CPU 1601, a memory 1602, a storage device 1603, and an NIC 1604. The CPU 1601 executes a file system program by executing a program stored in the memory 1602.

The memory 1602 stores a program to be executed by the CPU 1601, and data necessary for executing the program. For example, the memory 1602 stores a control program necessary for file access.

The storage device 1603 stores programs and files. For example, in a case where a shared file system is constructed, a file which is accessed by the job 200 is stored.

The NIC 1604 is an interface for establishing connection with the login host 110 and the computing host 120 via the network 100.

Next, a software configuration according to the second embodiment of this invention will be described. Similarly to the case of the first embodiment of this invention, the login host 110 according to the second embodiment of this invention stores the job 200 and a job scheduler 210 in the memory 112.

The job 200 is the same as that of the first embodiment of this invention. On the other hand, the job scheduler 210 includes an I/O host management table 1700 in addition to the configuration of the job scheduler 210 of the first embodiment of this invention.

The I/O host management table 1700 keeps identification information for the I/O hosts 1600, and allocation states of the job 200 among the I/O hosts 1600. It should be noted that detailed description of the I/O host management table 1700 will be made later with reference to FIG. 16.

Further, similarly to the case of the first embodiment of this invention, the computing host 120 stores the file system program 230 and the program 220 in the memory 122. The file system program 230 and the program 220 may be configured in the same manner as those of the first embodiment of this invention.

Here, with regard to the configuration of the file system program 230, in a case where all file accesses are carried out through the I/O hosts 1600, such a configuration that excludes the master server module 233 and the sub-server module 234 may be employed.

The I/O host 1600 stores the file system program 230 in the memory 1602. The configuration of the file system program 230 is the same as the file system program 230 provided to the computing host 120 according to the first embodiment of this invention. It should be noted that a configuration which excludes the client module 235 may be employed for the I/O host 1600.

FIG. 16 is a diagram illustrating an example of the I/O host management table 1700 according to the second embodiment of this invention.

The I/O host management table 1700 includes an I/O host identifier 1800, an I/O host name 1810, an IP address 1820, and an allocated job identifier 1830.

The I/O host identifier 1800 represents an identifier of the I/O host 1600 included in the computer system. The I/O host name 1810 represents a name of the I/O host 1600. The IP address 1820 represents an IP address of the I/O host 1600. The allocated job identifier 1830 represents an identifier of the job 200 which is allocated to the I/O host 1600.

FIG. 17 is a diagram illustrating an example of the file system configuration file 236 according to the second embodiment of this invention.

Similarly to the case of the first embodiment of this invention, the login host 110 creates, based on the received execution request for the job 200, the file system configuration file 236 which includes definition information of the shared file system. The login host 110 transmits the created file system configuration file 236 to the I/O host 1600, and gives an instruction to construct a shared file system.

The configuration of the file system configuration file 236 is the same as that of the first embodiment of this invention in terms of form. In the second embodiment of this invention, the functions of the master server and the sub-server are provided by the I/O host 1600, and hence, instead of the master server computing host name 500 and the sub-server computing host name list 510, the file system configuration file 236 includes a master server I/O host name 1900 and a sub-server I/O host name list 1910.

In a case where a shared file system is constructed using the file system configuration file 236 illustrated in FIG. 17, an I/O host 1600 having the I/O host identifier "io0" functions as the master server, whereas I/O hosts 1600 having the I/O host identifiers "io0" and "io1" function as the sub-servers. Further, computing hosts 120 having the computing host identifiers "comp0" and "comp1" function as the clients, and process a requested job.

Figure 18:
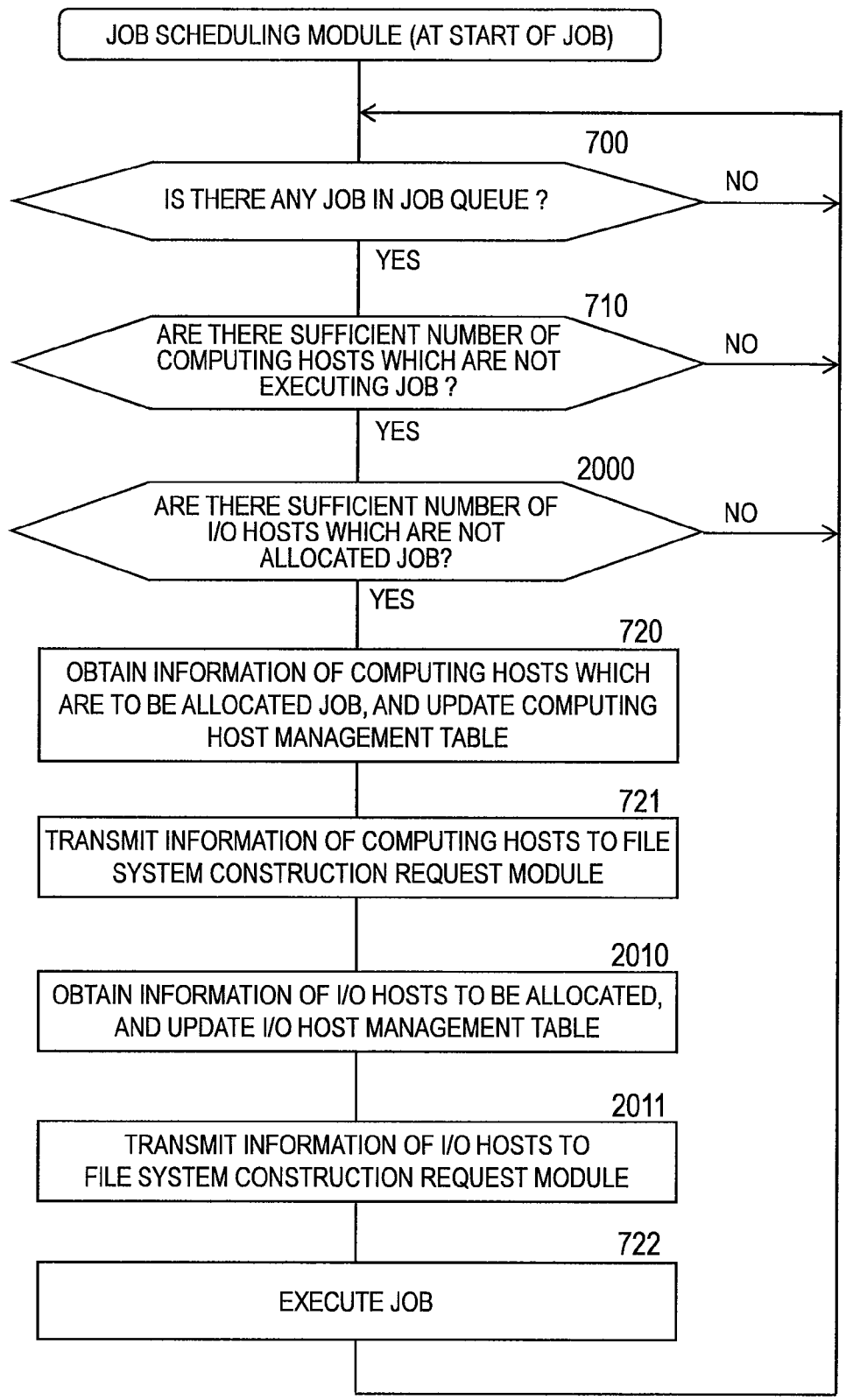
FIG. 18 is a flow chart illustrating a procedure in which a job waiting for execution is allocated to a computing host and the I/O host by a job scheduling module according to the second embodiment of this invention.

FIG. 18 is a flow chart illustrating a procedure in which a job 200 waiting for execution is allocated to the computing host 120 and the I/O host 1600 by the job scheduling module 212 according to the second embodiment of this invention.

Apart from the procedure of the first embodiment of this invention illustrated in FIG. 6, the processing performed by the job scheduling module 212 according to the second embodiment of this invention has an added procedure associated with the I/O host 1600.

First, similarly to the case of the first embodiment of this invention, the CPU 111 of the login host 110 judges whether or not any job waiting for execution is stored in the job queue 215 (Step 700). Then, the CPU 111 of the login host 110 further judges whether or not it is possible to assure a sufficient number of computing hosts 120 to execute the job 200 (Step 710).

In a case where it is possible to assure a sufficient number of computing hosts 120 to execute the job 200 (the result of Step 710 is "Yes"), the CPU 111 of the login host 110 further judges whether or not it is possible to assure a sufficient number of I/O hosts 1600 to execute the job 200 (Step 2000).

Specifically, the CPU 111 of the login host 110 refers to the I/O host management table 1700 to obtain the number of I/O hosts 1600 which have no value registered as the allocated job identifier 1830, and then judges whether or not the obtained number is equal to or larger than the number of I/O hosts 1600 necessary for executing the job 200. The I/O host 1600 is a computer having a higher file access capability, and hence the necessary number of I/O hosts 1600 may be set smaller than the number of computing hosts 120 necessary for executing the job. For example, the number of I/O hosts 1600 has only to satisfy a predetermined ratio with respect to the number of computing hosts 120 necessary for executing the job. Here, the predetermined ratio may be set as a ratio between all the I/O hosts 1600 and all the computing hosts 120 which constitute the computer system. Alternatively, the predetermined ratio may be set based on the capability of the I/O host 1600 or the like.

In a case where it is impossible to assure a sufficient number of I/O hosts 1600 to execute the job 200 (the result of Step 2000 is "No"), the CPU 111 of the login host 110 waits until a job which is being executed is completed.

On the other hand, in a case where it is possible to assure a sufficient number of I/O hosts 1600 to execute the job 200 (the result of Step 2000 is "Yes"), similarly to the case of the first embodiment of this invention, the CPU 111 of the login host 110 updates the computing host management table 216 (Step 720), and then executes the file system construction request module 213 (Step 721).

Further, the CPU 111 of the login host 110 obtains, from the I/O host management table 1700, information for the sufficient number of I/O hosts 1600 to execute the job 200, and then registers the identifier of the job 200 as the allocated job identifier 1830 of each of the I/O hosts 1600 (Step 2010).

In order to construct a shared file system, the CPU 111 of the login host 110 transmits the information of the I/O hosts 1600, which has been obtained in the processing of Step 2010, to the file system construction request module 213 (Step 2011).

Lastly, in a case where the shared file system has been constructed, the CPU 111 of the login host 110 obtains the job 200 waiting for execution from the job queue 215, and requests the computing host 120 to execute the obtained job 200 (Step 722).

Figure 19:
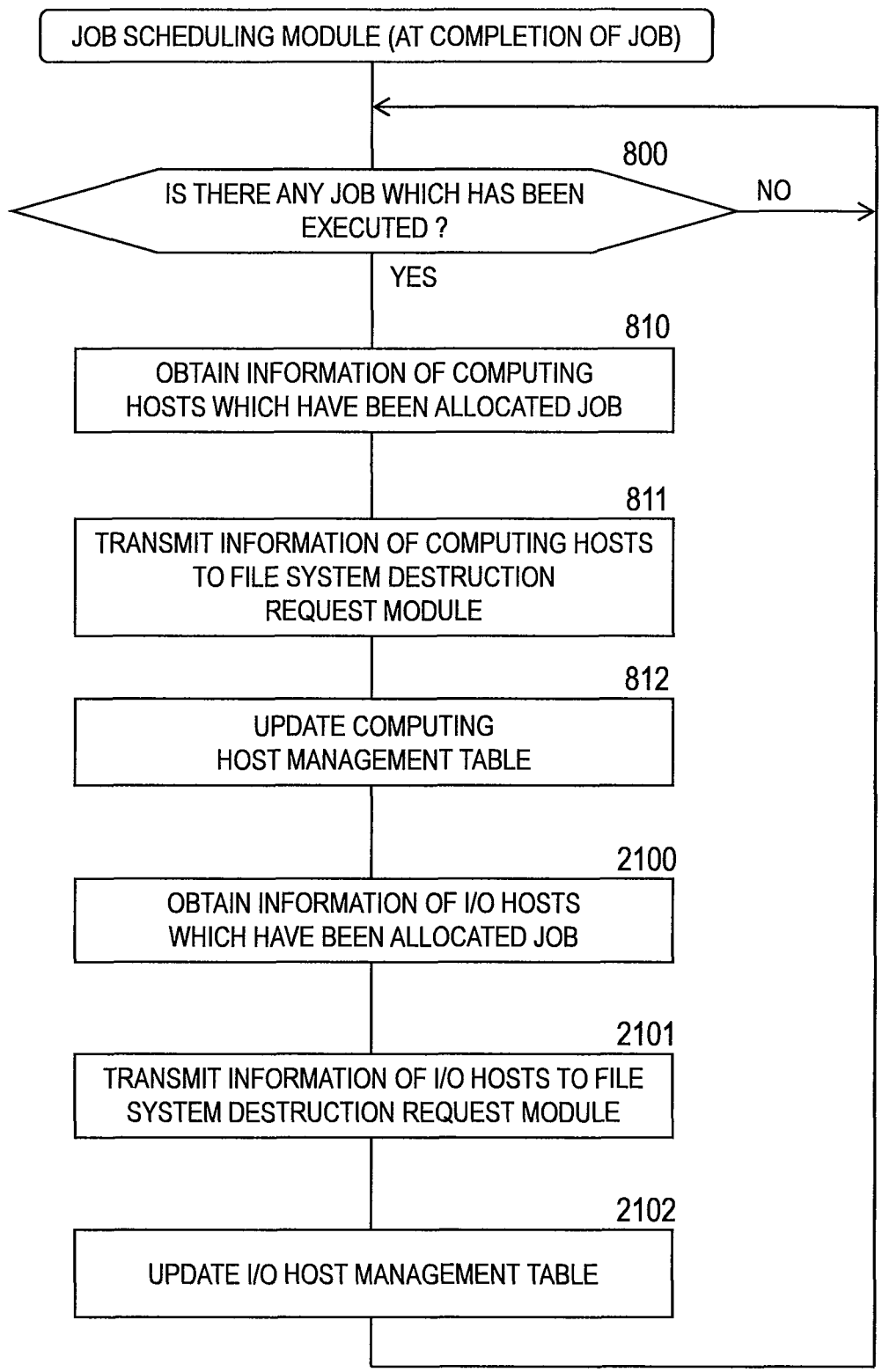
FIG. 19 is a flow chart illustrating a procedure in which allocation of a job to the computing hosts and the I/O hosts is canceled by a job scheduling module according to the second embodiment of this invention.

FIG. 19 is a flow chart illustrating a procedure in which allocation of the job 200 to the computing hosts 120 and the I/O hosts 1600 is canceled by the job scheduling module 212 according to the second embodiment of this invention.

Upon completion of the execution of the job (the result of Step 800 is "Yes"), similarly to the case of the first embodiment of this invention, the CPU 111 of the login host 110 cancels the allocation of the executed job to the computing hosts 120 (Steps 810 to 812).

The CPU 111 of the login host 110 further refers to the I/O host management table 1700, and then obtains the information of the I/O hosts 1600 which have the identifier of the executed job 200 registered as the allocated job identifier 1830 (Step 2100).

The CPU 111 of the login host 110 transmits the information of the I/O hosts 1600, which has been obtained in the processing of Step 2100, to the file system destruction request module 214 (Step 2101). Lastly, the CPU 111 of the login host 110 clears the allocated job identifier 1830 of each of the obtained I/O hosts 1600 (Step 2102).

Figure 20:
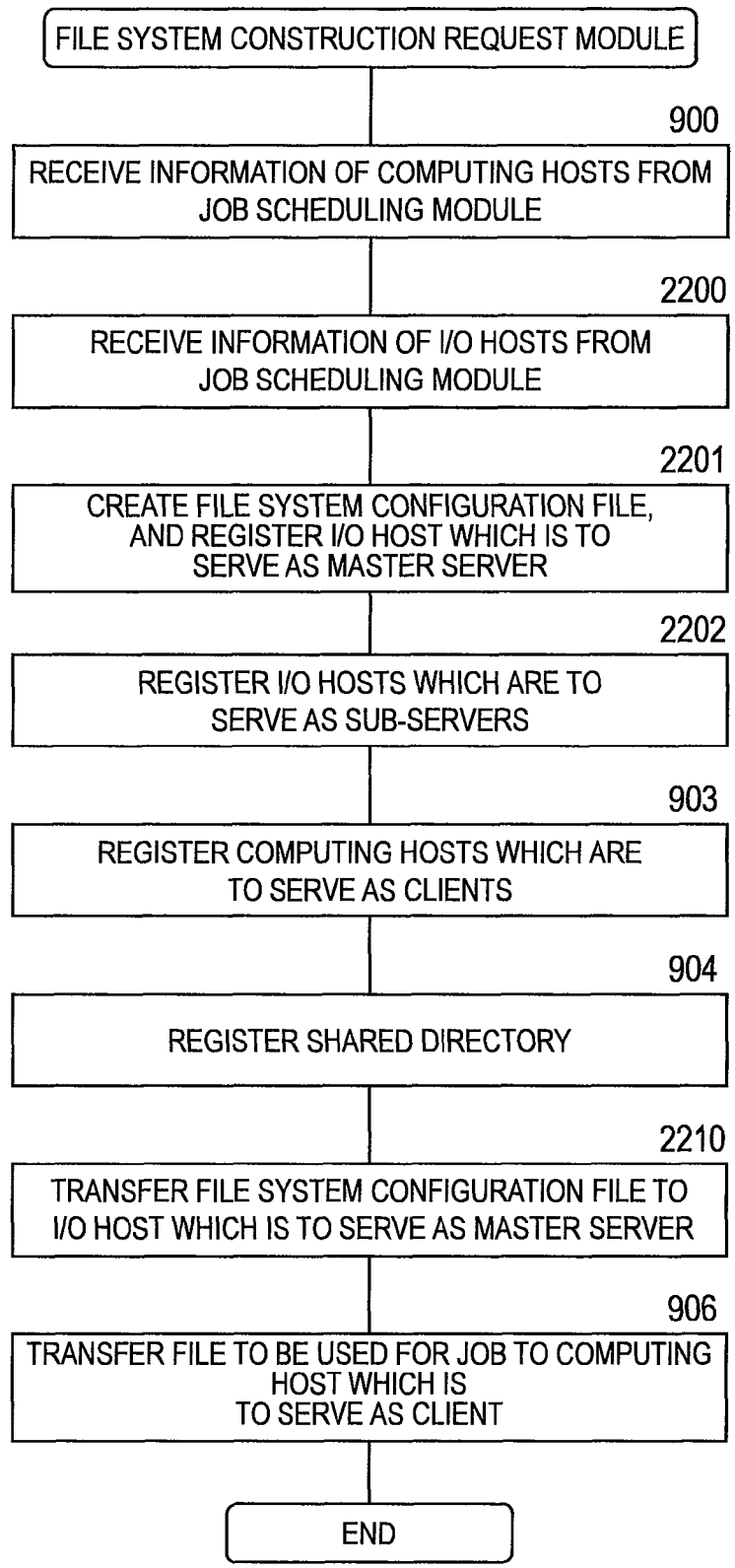
FIG. 20 is a flow chart illustrating a procedure in which a request to construct a shared file system is made by a file system construction request module according to the second embodiment of this invention.

FIG. 20 is a flow chart illustrating a procedure in which a request to construct a shared file system is made by the file system construction request module 213 according to the second embodiment of this invention.

The processing performed by the file system construction request module 213 according to the second embodiment of this invention includes processing associated with the I/O host 1600 in addition to the procedure of the first embodiment of this invention illustrated in FIG. 8.

After reception of the information of the computing hosts 120 from the job scheduling module 212 (Step 900), the CPU 111 of the login host 110 receives information of the I/O hosts 1600 which are allocated for the job 200 from the job scheduling module 212 (Step 2200).

Based on the received information of the I/O hosts 1600, the CPU 111 of the login host 110 creates the file system configuration file 236, and then registers an I/O host 1600 which is to serve as the master server (Step 2201). For example, an I/O host 1600 having the smallest identifier may be selected and registered from among the allocated I/O hosts 1600.

Next, the CPU 111 of the login host 110 registers I/O hosts 1600 which are to serve as the sub-servers (Step 2202). Specifically, the CPU 111 of the login host 110 registers all the I/O hosts 1600 which are allocated for the job 200 in the sub-server I/O host name list 1910 of the file system configuration file 236 illustrated in FIG. 17.

Similarly to the case of the first embodiment of this invention, the CPU 111 of the login host 110 registers computing hosts 120 which are to serve as the clients (Step 903). Further, the CPU 111 of the login host 110 registers a directory which is to store a shared file (Step 904).

The CPU 111 of the login host 110 transfers the created file system configuration file 236 to the I/O host 1600 which is registered as the master server of the shared file system in the processing of Step 2201 (Step 2210).

Lastly, the CPU 111 of the login host 110 transfers a file to be used for the job 200 to one of the computing hosts 120 which are registered as the clients of the shared file system in the processing of Step 903 (Step 906).

Figure 21:
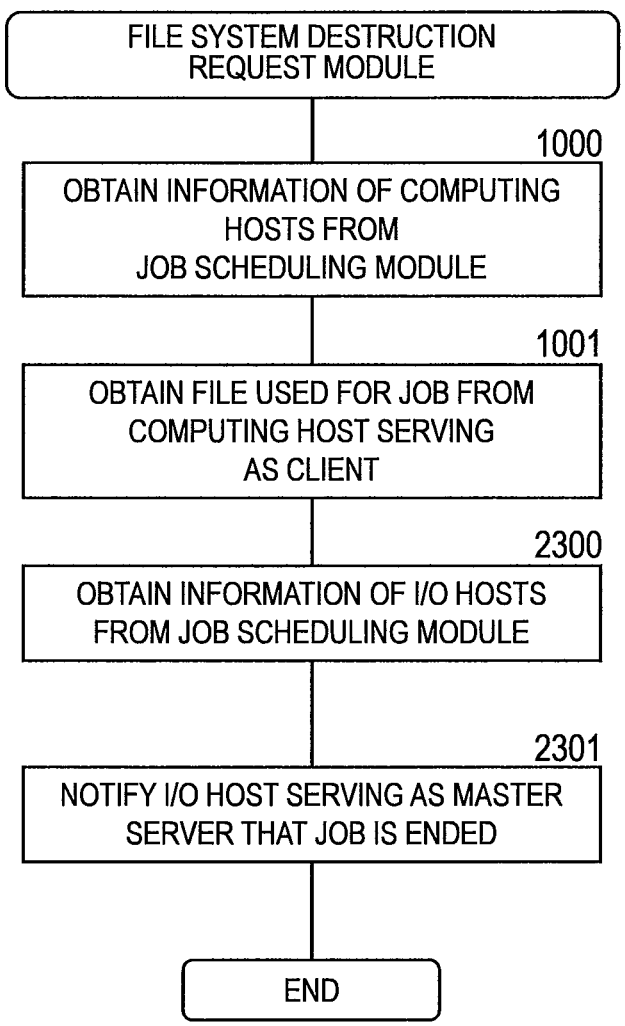
FIG. 21 is a flow chart illustrating a procedure in which a request to destruct the shared file system is made by a file system destruction request module according to the second embodiment of this invention.

FIG. 21 is a flow chart illustrating a procedure in which a request to destruct the shared file system is made by the file system destruction request module 214 according to the second embodiment of this invention.

The processing performed by the file system destruction request module 214 according to the second embodiment of this invention includes processing associated with the I/O host 1600 in addition to the procedure of the first embodiment of this invention illustrated in FIG. 9.

Similarly to the case of the first embodiment of this invention, the CPU 111 of the login host 110 receives, from the job scheduling module 212, the information of the computing hosts 120 which are allocated the job 200 (Step 1000), and obtains the file used for the job 200 from the computing host 120 serving as the client (Step 1001).

The CPU 111 of the login host 110 further receives, from the job scheduling module 212, the information of the I/O hosts 1600 which are allocated the job 200 (Step 2300), and notifies the I/O host 1600 which is registered as the master server of the shared file system that the execution of the job 200 has been ended (Step 2301).

Figure 22:
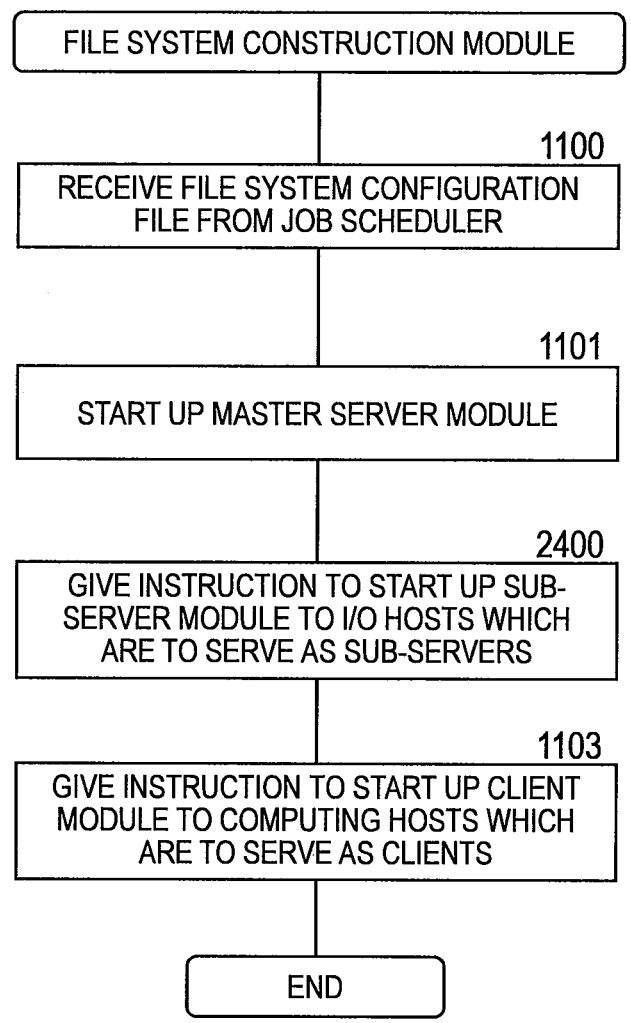
FIG. 22 is a flow chart illustrating a procedure in which a shared file system is constructed by a file system construction module according to the second embodiment of this invention.

FIG. 22 is a flow chart illustrating a procedure in which a shared file system is constructed by the file system construction module 231 according to the second embodiment of this invention.

The processing performed by the file system construction module 231 according to the second embodiment of this invention is obtained by partly changing the procedure of the first embodiment of this invention illustrated in FIG. 10, and includes a procedure associated with the I/O host 1600. Besides, in the first embodiment of this invention, the processing is executed by the computing host 120, but, in the second embodiment of this invention, the processing is executed by the I/O host 1600.

The CPU 1601 of the I/O host 1600 receives the file system configuration file 236 transmitted by the job scheduler 210 of the login host 110 (Step 1100), and then starts up the master server module 233 (Step 1101). It should be noted that detailed description of the master server module 233 will be made later with reference to FIG. 24.

The CPU 1601 of the I/O host 1600 gives an instruction to start up the sub-server module 234 to all the I/O hosts 1600 which are registered in the sub-server I/O host name list 1910 of the file system configuration file 236 received in the processing of Step 1100 (Step 2400). It should be noted that the processing performed by the sub-server module 234 is the same as the processing of the first embodiment of this invention illustrated in FIG. 13 except that the operation subject has been changed from the computing host 120 to the I/O host 1600.

Lastly, the CPU 1601 of the I/O host 1600 gives an instruction to start up the client module 235 to the computing hosts 120 which are registered in the client computing host name list 520 of the file system configuration file 236 received in the processing of Step 1100 (Step 1103). It should be noted that detailed description of the client module 235 will be made later with reference to FIG. 25.

Figure 23:
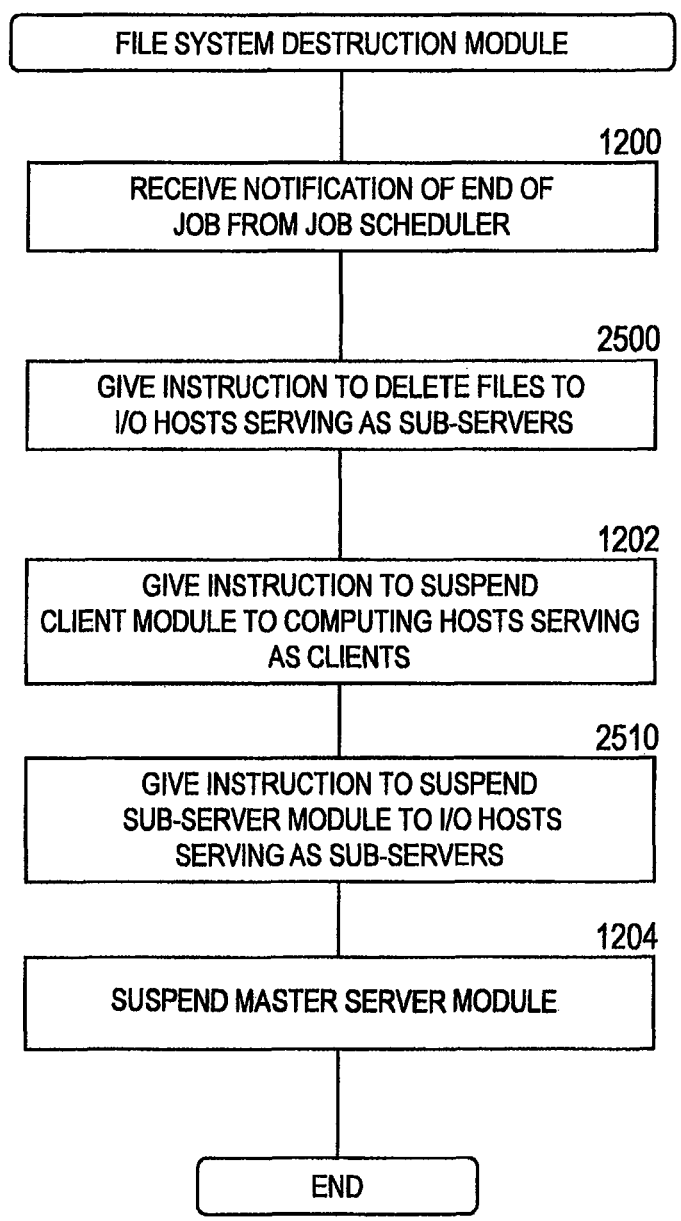
FIG. 23 is a flow chart illustrating a procedure in which a shared file system is destructed by a file system destruction module according to the second embodiment of this invention.

FIG. 23 is a flow chart illustrating a procedure in which a shared file system is destructed by the file system destruction module 232 according to the second embodiment of this invention.

The processing performed by the file system destruction module 232 according to the second embodiment of this invention is obtained by partly changing the procedure of the first embodiment of this invention illustrated in FIG. 11, and includes a procedure associated with the I/O host 1600.

The CPU 1601 of the I/O host 1600 receives a notification of the end of the job from the job scheduler 210 of the login host 110 (Step 1200).

The CPU 1601 of the I/O host 1600 refers to the file system configuration file 236, and then instructs all the I/O hosts 1600 registered as the sub-servers to delete a file which is duplicated at the time of execution of the job 200, and a file which is generated during the execution of the job 200 (Step 2500).

Similarly to the case of the first embodiment of this invention, the CPU 1601 of the I/O host 1600 refers to the file system configuration file 236, and then instructs all the computing hosts 120 registered as the clients to suspend the client module 235 (Step 1202).

The CPU 1601 of the I/O host 1600 refers to the file system configuration file 236, and then instructs all the I/O hosts 1600 registered as the sub-servers to suspend the sub-server module 234 (Step 2510).

Lastly, the CPU 1601 of the I/O host 1600 suspends the master server module 233 (Step 1204).

Figure 24:
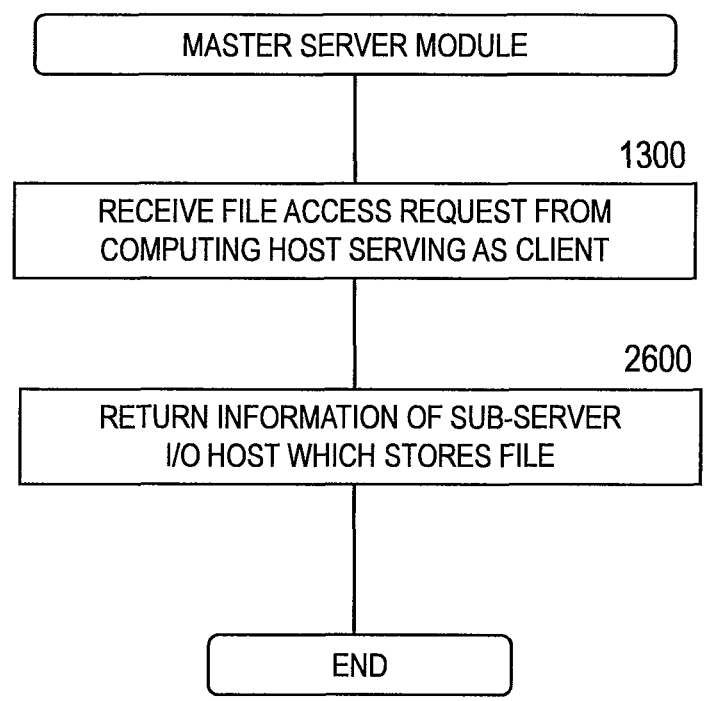
FIG. 24 is a flow chart illustrating a procedure of a processing performed by a master server of the shared file system according to the second embodiment of this invention.

FIG. 24 is a flow chart illustrating a procedure of the processing performed by the master server of the shared file system according to the second embodiment of this invention.

The processing performed by the master server module 233 according to the second embodiment of this invention is obtained by partly changing the procedure of the first embodiment of this invention illustrated in FIG. 12, and includes a procedure associated with the I/O host 1600.

The CPU 1601 of the I/O host 1600 receives a file access request transmitted from the computing host 120 serving as the client of the shared file system (Step 1300).

The CPU 1601 of the I/O host 1600 notifies the computing host 120, which has transmitted the access request in the processing of Step 1300, of the information of the sub-server I/O host 1600 which stores the requested file (Step 2600).

Figure 25:
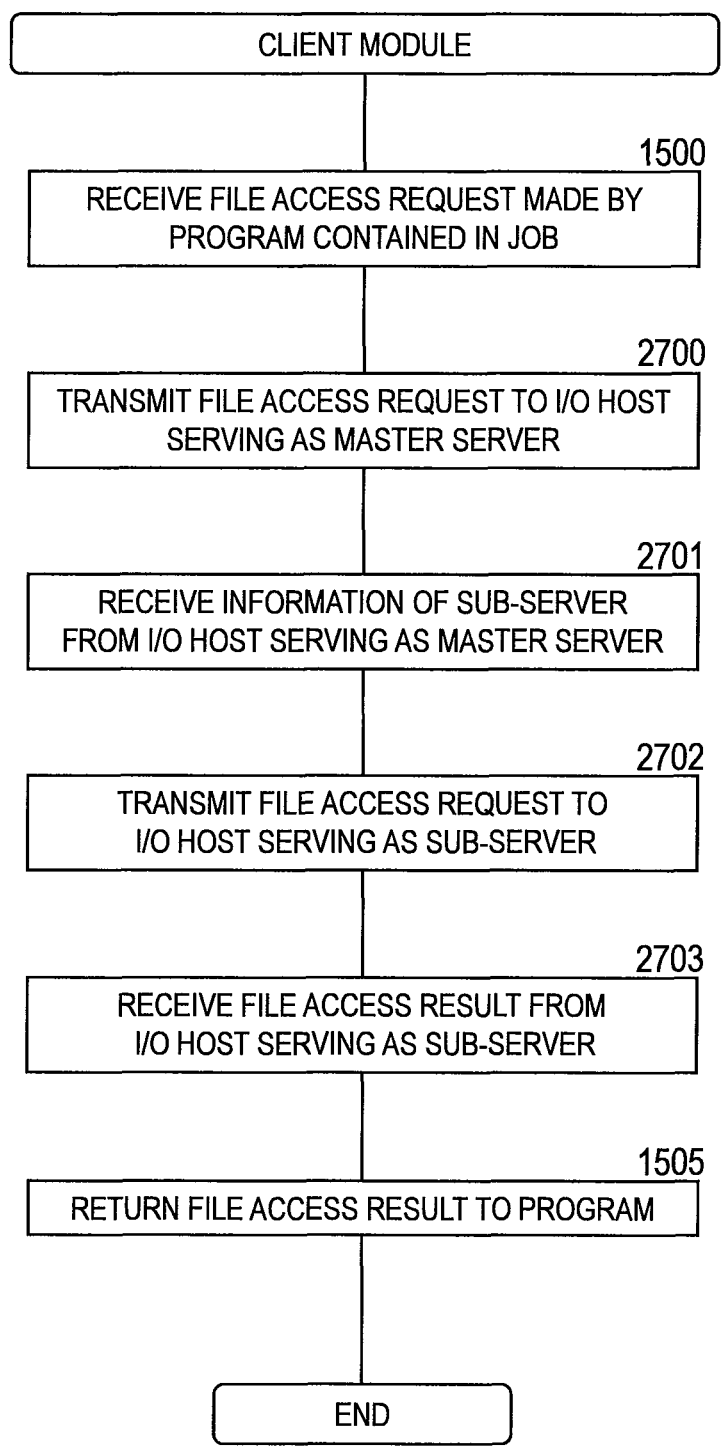
FIG. 25 is a flow chart illustrating a procedure of the processing performed by a client of the shared file system according to the second embodiment of this invention.

FIG. 25 is a flow chart illustrating a procedure of the processing performed by the client of the shared file system according to the second embodiment of this invention.

The processing performed by the client module 235 according to the second embodiment of this invention is obtained by partly changing the procedure of the first embodiment of this invention illustrated in FIG. 14, and includes a procedure associated with the I/O host 1600.

Similarly to the case of the first embodiment of this invention, the CPU 121 of the computing host 120 receives a file access requested through execution of the program 220 included in the job 200 (Step 1500).

The CPU 121 of the computing host 120 issues a file access request to the I/O host 1600 serving as the master server of the shared file system (Step 2700).

The CPU 121 of the computing host 120 receives, from the I/O host 1600 serving as the master server, the information of the sub-server I/O host 1600 which stores the file to be accessed (Step 2701).

Further, based on the information of the I/O host 1600 serving as the sub-server, which has been received in the processing of Step 2701, the CPU 121 of the computing host 120 issues a file access request (Step 2702).

Then, the CPU 121 of the computing host 120 receives, from the I/O host 1600 serving as the sub-server, an access result of the file access request transmitted in the processing of Step 2702 (Step 2703).

Lastly, the CPU 121 of the computing host 120 returns the access result of the file, which has been received in the processing of Step 2703, to the program 220 (Step 1505).

According to the second embodiment of this invention, similarly to the case of the first embodiment of this invention, it is possible to dynamically construct a shared file system which is configured by the computing hosts 120 which are allocated the job 200. Therefore, a processing delay caused by file access from another job or the like can be prevented. In addition, the shared file system is constructed by duplicating only a file necessary for the execution of the job 200, and hence the shared file system can be constructed quickly.

On top of that, according to the second embodiment of this invention, the constructing of a shared file system is executed using the I/O hosts 1600 having higher file access capabilities than the computing hosts 120. As a result, file access which is likely to become a bottleneck at the time of execution of a job can be processed with higher speed. In particular, it is possible to enhance the performance at the time of executing a job which imposes a heavy file access load, such as when the frequency of file access is high or when a file having a large volume is accessed.

This invention has been described above in detail according to the embodiments of this invention, but this invention is not limited to the above-mentioned embodiments, and various modifications may be made without departing the gist and scope of this invention.

This invention is applicable to file access management for a computer system, and more particularly, is applicable to shared file access management for a large-scale computer system.

What is claimed is:

1. A file sharing method used for a computer system which includes a plurality of computing hosts,
    each of the plurality of computing hosts comprising:
        a first interface coupled to another one of the plurality of computing hosts;
        a first processor coupled to the first interface; and
        a first memory coupled to the first processor, the file sharing method including the steps of, in a case where a job to be executed by some of the plurality of computing hosts is requested:
    sharing, by the first processor of the each of the some of the plurality of computing hosts, a file necessary for executing the job;
    executing, by the first processor of the each of the some of the plurality of computing hosts, the job through accessing the file; and
    canceling, by the first processor of the each of the some of the plurality of computing hosts, the sharing of the file after the executing of the requested job is completed;
    one of the plurality of computing hosts works as a job scheduler for receiving an execution request for the job;
    the one of the plurality of computing hosts comprises:

a second interface coupled to the plurality of computing hosts;
a second processor coupled to the second interface; and
a second memory coupled to the second processor; and
the file sharing method further includes the steps of:
receiving, by the second processor, the execution request for the job;
selecting, by the second processor, the plurality of computing hosts which execute the job based on the received execution request for the job;
calling for, by the second processor, a duplication of the file necessary for executing the job; and
sharing, by the first processor of the each of the plurality of computing hosts which execute the job, the duplication of the file.

2. The file sharing method according to claim 1, wherein:
the each of the plurality of computing hosts further includes a storage device for storing the file; and
the file sharing method further includes the steps of:
transferring, by the second processor, the duplication of the file to one of the plurality of computing hosts which execute the job; and
storing, by the first processor of the one of the plurality of computing hosts to which the duplication of the file is transferred, the duplication of the file in the storage device.

3. The file sharing method according to claim 2, further including the steps of:
selecting, by the second processor, a master server which keeps information for identifying the one of the plurality of computing hosts which stores the file from among the plurality of computing hosts;
identifying, by the first processor of the each of the plurality of computing hosts which execute the job, the one of the plurality of computing hosts which stores the file through making an inquiry to the master server in a case where the file necessary for executing the job is accessed; and
obtaining, by the first processor of the each of the plurality of computing hosts which execute the job, the file necessary for executing the job from the identified one of the plurality of computing hosts.

4. The file sharing method according to claim 3, further including the steps of:
transmitting, by the second processor, file sharing system configuration information that includes a list of the plurality of computing hosts which execute the job to the master server before the transferring of the duplication of the file; and
identifying, by the first processor of the master server, the one of the plurality of computing hosts which stores the file necessary for executing the job based on the file sharing system configuration information.

5. The file sharing method according to claim 1, wherein:
the plurality of computing hosts further include a plurality of I/O hosts each having a higher file access capability than the plurality of computing hosts;
each of the plurality of I/O hosts comprises:
a third interface capable of communication with the job scheduler and the plurality of computing hosts;
a third processor coupled to the third interface;
a third memory coupled to the third processor; and
a storage device for storing the file; and
the file sharing method further includes the steps of:
selecting, by the second processor, at least one of the plurality of I/O hosts which stores the file based on the received execution request for the job;
transferring, by the second processor, the generated duplication of the file to the selected at least one of the plurality of I/O hosts;
storing, by the third processor of the selected at least one of the plurality of I/O hosts, the duplication of the file in the storage device; and
obtaining, by the first processor of the each of the plurality of computing hosts which execute the job, the file necessary for executing the job from the selected at least one of the plurality of I/O hosts.

6. The file sharing method according to claim 5, further including the steps of:
selecting, by the second processor, a master server which keeps information for identifying the at least one of the plurality of I/O hosts which stores the file from among the selected at least one of the plurality of I/O hosts;
identifying, by the first processor of the each of the plurality of computing hosts which execute the job, the at least one of the plurality of I/O hosts which stores the file through making an inquiry to the master server in a case where the file necessary for executing the job is accessed; and
obtaining, by the first processor of the each of the plurality of computing hosts which execute the job, the file necessary for executing the job from the identified at least one of the plurality of I/O hosts.

7. The file sharing method according to claim 6, further including the steps of:
transmitting, by the second processor, file sharing system configuration information which includes a list of the at least one of the plurality of I/O hosts which stores the file to the master server before the transferring of the duplication of the file; and
identifying, by the third processor of the master server, the at least one of the plurality of I/O hosts which stores the file necessary for executing the job based on the file sharing system configuration information.

8. The file sharing method according to claim 5, further including the step of determining, by the second processor, the number of the at least one of the plurality of I/O hosts to be selected based on a ratio between the number of the plurality of computing hosts and the number of the plurality of I/O hosts in the plurality of computing hosts.

9. A computer system which includes a plurality of computing hosts;
each of the plurality of computing hosts comprises:
a first interface coupled to another one of the plurality of computing hosts;
a first processor coupled to the first interface; and
a first memory coupled to the first processor; and
the each of the plurality of computing hosts which execute a job is configured to, in a case where the job is requested to be executed by some of the plurality of computing hosts:
share, by the some of the plurality of computing hosts, a file necessary for executing the job;
execute, by the some of the plurality of computing hosts, the requested job through accessing the file; and
cancel, by the some of the plurality of computing hosts, the sharing of the file after the executing of the requested job is completed;
one of the plurality of computing hosts works as a job scheduler for receiving an execution request for the job;
the one of the plurality of computing hosts comprises:
a second interface coupled to the plurality of computing hosts;

a second processor coupled to the second interface; and
a second memory coupled to the second processor; and
the file sharing method further includes the steps of:
receiving, by the second processor, the execution request for the job;
selecting, by the second processor, the plurality of computing hosts which execute the job based on the received execution request for the job;
calling for, by the second processor, a duplication of the file necessary for executing the job; and
sharing, by the first processor of the each of the plurality of computing hosts which execute the job, the duplication of the file.

10. The computer system according to claim 9, wherein:
the each of the plurality of computing hosts further comprises a storage device for storing the file;
the job scheduler is configured to transfer the duplication of the file to one of the plurality of computing hosts which execute the job; and
the one of the plurality of computing hosts to which the duplication of the file is transferred is configured to store the duplication of the file in the storage device.

11. The computer system according to claim 10, wherein:
the job scheduler is configured to select a master server which keeps information for identifying the one of the plurality of computing hosts which stores the file from among the plurality of computing hosts; and
the each of the plurality of computing hosts which execute the job is configured to, in a case where the file necessary for executing the job is accessed:
identify the one of the plurality of computing hosts which stores the file through making an inquiry to the master server; and
obtain the file necessary for executing the job from the identified one of the plurality of computing hosts.

12. The computer system according to claim 9, wherein:
the plurality of computing hosts further include a plurality of I/O hosts each having a higher file access capability than the plurality of computing hosts;
each of the plurality of I/O hosts comprises:
a third interface capable of communication with the job scheduler and the plurality of computing hosts;
a third processor coupled to the third interface;
a third memory coupled to the third processor; and
a storage device for storing the file;
the job scheduler is further configured to:
select, by the second processor, at least one of the plurality of I/O hosts which stores the file based on the received execution request for the job; and
transfer, by the second processor, the generated duplication of the file to the selected at least one of the plurality of I/O hosts;
the selected at least one of the plurality of I/O hosts is configured to store the duplication of the file in the storage device; and
the each of the plurality of computing hosts which execute the job is configured to obtain the file necessary for executing the job from the selected at least one of the plurality of I/O hosts.

13. The computer system according to claim 12, wherein:
the job scheduler selects a master server which keeps information for identifying the at least one of the plurality of I/O hosts which stores the file from among the selected at least one of the plurality of I/O hosts; and
the each of the plurality of computing hosts which execute the job is further configured to, in a case where the file necessary for executing the job is accessed:
identify the at least one of the plurality of I/O hosts which stores the file through making an inquiry to the master server; and
obtain the file necessary for executing the job from the identified at least one of the plurality of I/O hosts.

* * * * *